(12) United States Patent
Breslin

(10) Patent No.: US 11,306,742 B2
(45) Date of Patent: Apr. 19, 2022

(54) SUBMERSIBLE PNEUMATIC PUMP WITH AIR-EXCLUSION VALVE

(71) Applicant: Michael K. Breslin, Mill Valley, CA (US)

(72) Inventor: Michael K. Breslin, Mill Valley, CA (US)

( * ) Notice: Subject to any disclaimer, the term of this patent is extended or adjusted under 35 U.S.C. 154(b) by 400 days.

(21) Appl. No.: 15/583,866

(22) Filed: May 1, 2017

(65) Prior Publication Data

US 2018/0313369 A1   Nov. 1, 2018

(51) Int. Cl.
*F04F 1/08*  (2006.01)
*F16K 15/04* (2006.01)
*F16K 31/22* (2006.01)

(52) U.S. Cl.
CPC ............... *F04F 1/08* (2013.01); *F16K 15/04* (2013.01); *F16K 31/22* (2013.01)

(58) Field of Classification Search
CPC ....................................................... F04F 3/00
See application file for complete search history.

(56) References Cited

U.S. PATENT DOCUMENTS

| 122,950 | A | 1/1872 | Lytle |
| 1,092,382 | A | 4/1914 | Ness |
| 1,615,514 | A | 1/1927 | Latta |
| 3,764,235 | A | 10/1973 | Bittermann |
| 4,000,989 | A | 1/1977 | Dunegan |
| 4,527,633 | A | 7/1985 | McLaughlin |
| 5,004,405 | A | 4/1991 | Breslin |
| 5,358,009 | A | 10/1994 | Campbell |
| 5,358,073 | A | 10/1994 | Wothrich |
| 5,470,206 | A * | 11/1995 | Breslin ..................... F04F 1/08 417/131 |
| 5,487,647 | A | 1/1996 | Breslin |
| 5,868,280 | A | 2/1999 | Schroeder |
| 5,944,490 | A | 8/1999 | Breslin |
| 6,027,314 | A * | 2/2000 | Breslin ..................... F04F 1/08 417/131 |
| 6,039,546 | A | 3/2000 | Edwards et al. |
| 6,220,823 | B1 * | 4/2001 | Newcomer ............... F04F 1/06 166/372 |
| 6,234,761 | B1 | 5/2001 | Kocsis et al. |
| 7,316,544 | B2 | 1/2008 | Vidrine |

FOREIGN PATENT DOCUMENTS

| CN | 201520078175 B2 | 2/2015 |
| JP | 56084158 B2 | 5/1981 |

* cited by examiner

*Primary Examiner* — Dominick L Plakkoottam
*Assistant Examiner* — Charles W Nichols
(74) *Attorney, Agent, or Firm* — David Pressman

(57) ABSTRACT

A submersible pneumatic canister pump system for pumping liquid from a tank or underground location by incorporating a valve inside the pump for preventing air from exiting with the liquid discharge. The floating-ball valve is located near the lower end of the pump and communicates with the discharge pipe. When liquid level approaches the lower end of the pump, a ball of lighter density than the liquid rests on a seat and prevents further discharge of liquid and the passage of air out of the pump. Also various pump control arrangements can be used to operate the pump and a quick-passage check valve can be used to enhance operation.

27 Claims, 12 Drawing Sheets

SUBMERSIBLE PNEUMATIC PUMP WITH AIR-EXCLUSION VALVE

CROSS REFERENCE TO RELATED APPLICATION

This Application is a Continuation-In-Part of copending U.S. application Ser. No. 15/145,707, filed May 3, 2016, titled Submersible Pneumatic Pump With Air Exclusion Valve, now abandoned.

BACKGROUND—PRIOR ART

Pneumatically powered submersible pumps have been in use in many industries for many years for moving liquids from below ground or tanks to storage, treatment and/or disposal. Such pumps have the ability to move solids and operate in difficult environments where electric pumps may have problems. These types of canister pumps have been and are used to move sewage from collection points, or lift stations, to the sewage treatment plants. They have also been used for underground environmental remediation where electricity was not desired or available or the environment required special materials that were not easily incorporated into electric pumps. Such canister pump construction is fairly simple and their operation easy to understand. Such pumps can be operated and serviced with a minimal amount of training. Very few moving parts are in the pump, so they can be very reliable and easy to operate and service. Compressed air is often preferred over electricity as the motive force for pumping such liquids when the liquid being pumped is flammable or the area in which the pump must operate, such as on an oil refinery, is susceptible to fire. The fill and discharge cycles of such pumps are usually controlled using preset timer controls.

Both pneumatic and electric timers have been used to operate such pumps. One of the problems with timer-controlled submersible canister pumps is that compressed air can be pushed out of the pumps along with the fluid being pumped if the pressurization cycle is too long. Previously the construction of submersible pneumatically-driven canister pumps has been such that it permits this to happen due to poor timer settings.

Many factors can negatively influence timer settings which can result in discharging compressed air with the liquid being pumped, including water in the compressed air line, a change in air pressure, changes in submersion of the pump due to ground water fluctuations, and changes in back pressure in the discharge line. These and other factors can cause the once-proper and safe settings to become improper and potentially dangerous. When compressed air exits a canister pump with the liquid being pumped, oxygen can mix with suspended and dissolved constituents in the liquid forming deposits in discharge lines. If the liquid is flammable an explosive atmosphere can result. If the liquid contains hydrocarbons, hydrocarbons can be emitted into the atmosphere, contributing to air pollution.

The following is a tabulation of some prior art that presently appears relevant to this field and that of the present developments:

| Pat. No. | Kind Code | Issue Date | Patentee |
| --- | --- | --- | --- |
| 122,950 | B1 | 1872 Jan. 23 | Lytle |
| 1,092,382 | B1 | 1914 Apr. 7 | Ness |
| 1,615,514 | B1 | 1927 Jan. 25 | Latta |
| 3,764,235 | B1 | 1973 Oct. 9 | Bittermann |
| 4,000,989 | B1 | 1977 Jan. 4 | Dunegan |
| 4,527,633 | B1 | 1985 Jul. 9 | McLaughlin |
| 5,004,405 | B1 | 1991 Apr. 2 | Breslin |
| 5,358,009 | B1 | 1994 Oct. 25 | Campbell |
| 5,358,073 | B1 | 1994 Oct. 25 | Edwards, et al |
| 5,470,206 | B1 | 1995 Nov. 28 | Breslin |
| 5,487,647 | B1 | 1996 Jan. 30 | Breslin |
| 5,868,280 | B1 | 1999 Feb. 9 | Schroeder |
| 5,944,490 | B1 | 1999 Aug. 31 | Breslin |
| 6,027,314 | B1 | 2000 Feb. 22 | Breslin |
| 6,039,546 | B1 | 2000 Mar. 21 | Edwards, et al. |
| 6,095,759 | B1 | 2000 Aug. 1 | Breslin |
| 6,220,823 | B1 | 2001 Apr. 24 | Newcomer |
| 6,234,761 | B1 | 2001 May 22 | Kocsis, et al |
| 7,316,544 | B2 | 2008 Jan. 8 | Vidrine |

| Patent Application | Country | Appl Date | Inventor/Assignee |
| --- | --- | --- | --- |
| JP56084158 | Japan | 1981 May 29 | Itaya/Mitsubishi |
| CN201520078175 | China | 2015 Feb. 4 | Pan, et al |

There have been a myriad of submersible pneumatically powered ejector or canister pump designs created for different industries for the purpose of moving liquids; see the Lytle and McLaughlin patents. Generally they all have an inlet check valve, a discharge check valve, a discharge pipe, an outer casing, a way of introducing a pressurized gas to push liquid out of the pump, and a way to exhaust pressurized gas from the pump. The expulsion of compressed air with the fluid being pumped can cause the problems noted at the end of the previous paragraph.

Previous designers have added external additions to such pumps that were designed to remove air in the fluid discharge. They include air removal devices, such as those manufactured by Val-Matic Valve & Manufacturing Co. of Elmhurst, Ill. These, however, remove the air after it leaves the pump. Sometimes this is too late to prevent some of the negative effects of mixing air with the liquid. Often there is no room for these on environmental remediation sites or the pipelines are buried. In addition, the piping and valve costs can be expensive, especially on an oil refinery.

Submersible pneumatic pumps have been made with valves for allowing water to flow out of the bottom of the pump and remove what is above the water; see Edwards '546. They were not designed to prevent air from being pushed out of the pump discharge with liquid, nor do they do so.

Submersible pneumatic pumps have been made with float-actuated controls; see Ness '382, Breslin '405, and Breslin '494. These designs often necessitate rather large floats that require nearly the entire inside annular space of the pump. This is especially true with pumps being used to pump from wells where space is very limited. Such floats can be fouled by debris getting into the pump and thereby jamming the float or the air valves these floats operate. If material builds up on the pump wall or the float, the pump may not operate. The other moving parts in the pump can also be fouled. Aggressive liquids can attack the float and valve materials. Deposition of materials from the water, such as iron deposits, can jam the pump and necessitate frequent cleaning. Compressed air can facilitate the deposition of such material due to the oxygen compressed air introduces into the pump.

Casing-activated pumps (see Breslin '617, Breslin '314) have been designed to circumvent the need for an internal float to actuate pump air valves. Those casing-activated pumps with sliding seals for the casing can be fouled by deposits. Those with bellow seals have been found to need to operate within a relatively narrow pneumatic pressure range.

Pan '175 shows a design for a large air/water separation tank that is filled via an external well pump. Pan's design requires a vacuum pump on top of the tank to remove air from the tank and a third pump inside the tank to move the fluid from inside the tank. Also it requires three pumps to move water from a well. This system is designed to function outside of a well and so requires more equipment than is necessary for removing fluid from a well without air in the fluid.

Itaya shows a design for a large air/water separation tank. Itaya's tank is filled via an external pump. There is a floating ball in the discharge piping that prevents air from exiting with the water. Itaya shows an air outlet at the top of the tank. The pressure on the fluid leaving the tank is limited and determined by the height of the water inside the tank and/or imposed back pressure on the air exhaust. If the fluid discharge backpressure is less than the imposed back pressure placed on the tank air exhaust, it is possible for air to remain in the tank and the floating ball to seat, closing off fluid discharge. Unless the buoyancy force of the ball has been designed to overcome all possible resulting internal tank pressures, flow will not restart automatically. Such designs necessitate a relatively large ball compared to a relatively small opening in the seat, which would restrict flow. This would generally cause the design to be unsuitable for well pumping. If no back pressure is on the air exhaust, the fluid discharge pressure is limited by the height of fluid in the tank. An increase in fluid discharge back pressure could cause the tank to overflow through the air exhaust. These are both serious drawbacks to the system if it operates without surveillance. Moreover the system is employed outside of a well and so requires more equipment than is necessary for removing fluid from a well without air in the fluid.

For the purpose of this disclosure the above patents are incorporated by reference as if fully set forth herein.

SUMMARY

In accordance with one embodiment, the liquid in a pneumatic submersible canister pump can be safely discharged without the problem of compressed air being discharged along with the liquid. Mixing compressed air with discharged liquids can create harmful and sometimes dangerous results. This pump has a bottom-mounted inlet with a check valve for allowing liquid in, but not back out, and a top-mounted outlet with a check valve for allowing liquid out, but not back in. The discharge pipe for the canister pump has a pipe tee at its base inside the pump. One end of the cross portion of the tee is attached to the bottom of the discharge pipe. The other end of the cross of the tee is attached to the inlet check valve. The 90° branch of the tee has an L-shaped fitting attached. The horizontal end of the L-shaped fitting is attached to the pipe tee on the bottom of the discharge pipe, while the vertical end faces upward with a cage, ball, and seat on its open end. The ball has a lower specific gravity than water or any other liquid expected to enter the pump so that it floats on the liquid. The ball is captive in the cage above the seat so it will reseat when the fluid level in the canister falls to the level of the floating ball seat. The cage has almost all of its perforations near the base and a protective area for the ball in its upper area where the ball can float without being pulled down to the seat by discharging water. One or more small perforations can be provided near the top of the cage for allowing air to escape from the protected area. The protected area can be eliminated if the screened inlet to the air-exclusion valve is extended upward in the pump sufficiently away from the seat so the floating ball would not be entrained by discharging liquid and be pulled onto the seat until the water level nears the seat. When fluid in the canister is falls near the floating ball seat, the floating ball closes off the discharge of fluid and air and thus no air can be pushed out of the pump with fluid.

ADVANTAGES

From the description above, a number of advantages of one or more embodiments of my air-exclusion valve for submersible pneumatic pumps become evident:

(a) The air-exclusion valve in combination with piping for allowing liquid flow to and/or from a discharge pipe in a pneumatic canister pump prevents compressed air and/or other gases that have entered the pump from being pushed up the discharge tube with the liquid in the pump, thus reducing turbulence in the liquid being discharged.

(b) The above arrangement also prevents compressed air and/or other gases that have entered the pump from being pushed up the discharge tube with the liquid in the pump thus reducing oxygen contact with the liquid being pumped which may cause adverse chemical reactions (c) The arrangement also prevents compressed air and/or other gases that have entered the pump from being pushed up the discharge tube with the liquid in the pump thus reducing the chance that oxygen may mix with fumes from the liquids being pumped and other gases in the well which could result in a flammable or explosive mixture being created or hydrocarbons being released to the atmosphere.

(d) The air-exclusion valve arrangement in a submersible, pneumatically driven canister pump can be used in combination with timers to eliminate air being discharged with the fluid being pumped. That allows existing timer systems to be used with the improved pump design.

(e) Further, it allows the controls to use only one timer instead of the two that are normally used, thus reducing costs since pneumatic timers can be much more expensive than typical air valves.

(f) It further allows the controls to use only one pneumatic timer instead of the two that are normally used, thus reducing possible problems because pneumatic timers are more prone to failure than most pneumatic air valves.

(g) It additionally makes the setting of the controls by a technician much simpler, since there is no need to be careful setting a timers that govern the pressurization and exhaust cycles of the pump.

(h) Landfills and other sites currently use down-well submersible pneumatically-powered pumps that use an internal float to trigger pneumatic valves to allow compressed air into and out of the pump and thus allow the pump to alternately fill with fluid from the well and discharge it elsewhere. Such a pump is shown by Breslin '405. Such wells can contain viscous fluids and/or dissolved and suspended materials in the fluid being pumped which drop out of suspension due to the exposure to compressed air in the pump. Viscous fluids and previously suspended solids or dissolved materials can be deposited on the inside of such pumps along walls that do not experience rapid flow of fluid. The inside wall of the pump casing, the outer wall of the discharge tube and the surfaces of the internal float have been shown to be especially prone to such deposits and the adherence of viscous fluids.

(i) In the most used float-actuated submersible pump size (3.5-inch O.D.) the outer wall of the float is usually within a half-inch of the inner wall of the casing and the inner wall of the float is within a quarter-inch of the outer wall of the discharge tube, so the jamming of the float is not unusual. Such a large float is necessary to operate the linkage and valving within the pump. When the internal float or valve mechanism of such a pump is jammed by such deposits or viscous fluids, the pump can fail and have to be removed from the well to be cleaned. This is costly to the operator in labor and possibly replacement parts.

The removal of the pump from a well can have additional costly results because the fluid removal from the well is halted and can result in a rise in groundwater level that allows contaminants below a refinery to flow elsewhere than the well, or the reduced production of valuable, energy-generating methane gas at a landfill due to rising fluid levels closing off well openings through which methane reaches the well.

The present pump herein uses no such large internal float and corresponding pneumatic valve triggering mechanisms as shown in Breslin '405. The first and second embodiments use only check valves and piping in its interior. These are the two components that have been proven to be the most resilient in resisting deposits in submersible pneumatically-powered canister pumps. This is due to the rapid flow of fluid through them and the movement of the balls or flappers in the check valves. Both actions prevent the buildup of deposits and promote the removal of any deposits that happen to occur. Deposits can build up on the inner wall of the pump casing and the outer wall of the discharge tube to a substantial level without affecting the operation of the pump.

(j) Any floats shown in embodiments that trigger valves or switches are relatively small and can be arranged to have much greater clearances than those in pumps as shown in Breslin '405. They are also at the upper end of the pump and are only partly submerged during a relatively small portion of the fill and discharge cycles of the pump. Pumps as in Breslin '405 have some of the areas of small clearances mentioned above constantly submerged and others exposed to compressed air and fluid during every pump cycle. Such submersion and such air/fluid interfaces are often the cause of corrosion and build up.

(k) If a pump, such as shown in Breslin '405, with an internal float and pneumatic air valve triggering mechanisms jams due to deposits or viscous fluids, it can discharge compressed air continuously into the fluid discharge line until the problem is discovered and corrected.

Such compressed air discharge could last hours, days or weeks. This is not only costly in energy and compressor use, it could result in:

a. Oxygen mixing with the fluid being discharged by other wells and possibly creating a flammable situation or increasing the discharge of hydrocarbons into the atmosphere, which can result in regulatory action against the operator.

b. Turbulence in the fluid discharged preventing suspended solids from settling out, causing additional fluid treatment processes before discharging the fluid.

c. Mixing water and oil to increase the contamination of the water with hydrocarbons, which can necessitate additional water treatment before discharging the water.

d. Adverse chemical reactions between the materials in the fluid, which could cause unwanted depositions or chemical compositions to be formed.

(l) The pump does not incorporate internal floats with physically connected pneumatic triggering mechanisms to instigate the fill and discharge pump cycles as shown in Breslin '405 and thus will not suffer from the same jamming failure problems of those designs.

(m) The embodiments that employ only check valves and piping in combination with external and remote pneumatic controls and as such will not jam and fail as pumps as shown in Breslin '405.

It will be appreciated by those having ordinary skill in the art that jamming due to such depositions will cause clogging of such pumps and would necessitate the pumps to be removed from service and cleaned.

(n) Every embodiment is designed to close off fluid flow to discharge piping when the interior fluid level reaches the lower area of the pump, thus preventing air from discharging from the pump. This is not true of prior art canister pumps controlled by timer controls even if there is no build up inside the pump.

(o) The vital functioning components of the embodiments that employ only check valves and piping inside the pump casing will not be adversely affected by build-up of viscous materials or deposits on the inner wall of the casing or outer wall of the discharge pipe. This is a significant advantage over pumps as shown in Breslin '405.

Further advantages of one or more aspects will become apparent from a consideration of the ensuing description and accompanying drawings.

DRAWINGS

DRAWINGS--REFERENCE NUMERALS

Figure 1:
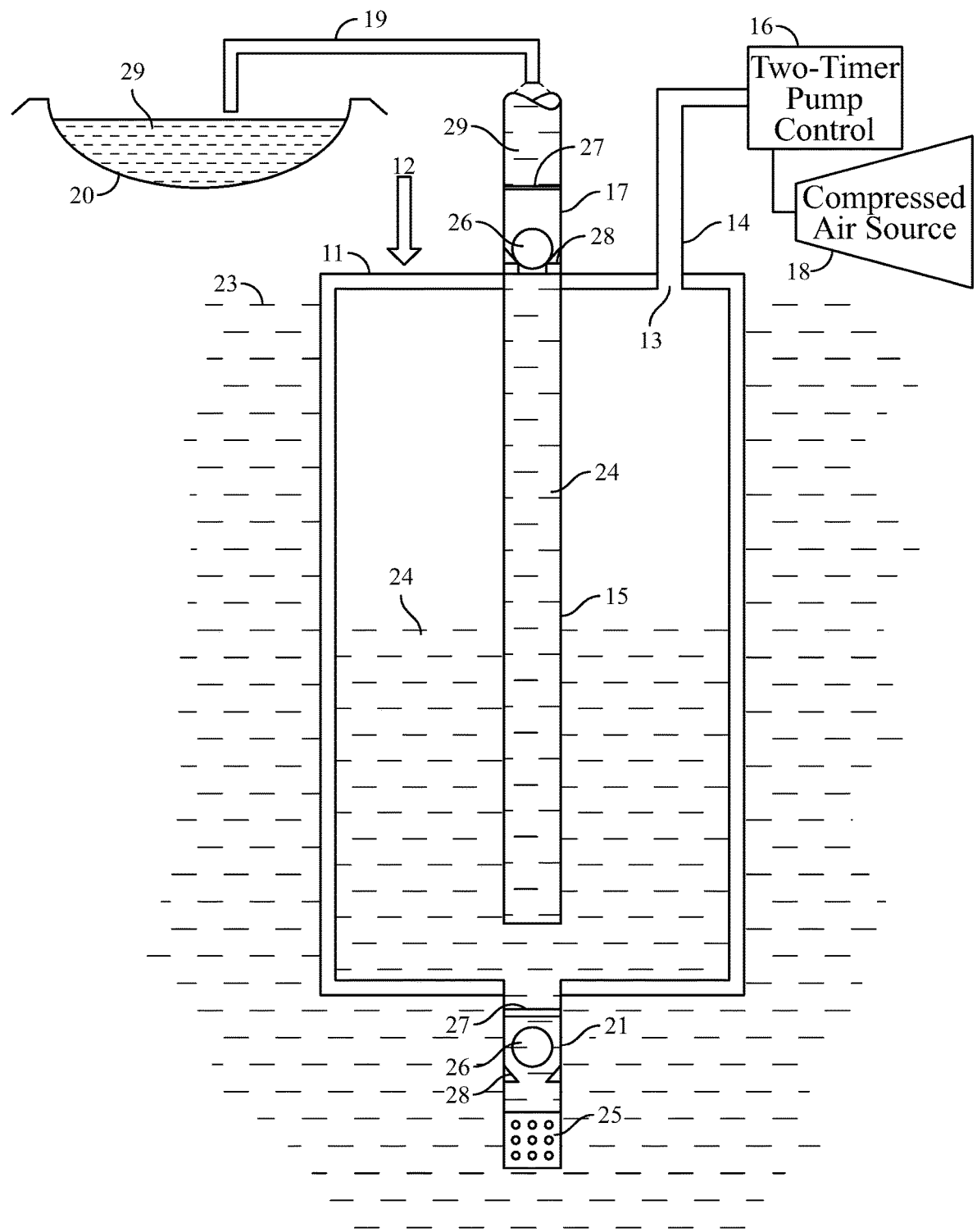
FIG. 1 shows prior art schematic view of a typical bottom-loading prior-art submersible pneumatic canister pump with a two-timer pump control currently in use in many industries.

| | | | |
|---|---|---|---|
| 11 | Pump casing | 12 | Prior art pneumatic submersible canister pump |
| 13 | Opening for compressed air to enter and exhaust air to exit | | |
| 14 | Air hose | 15 | Discharge pipe |
| 16 | Two-timer pump control | 17 | Discharge check valve |
| 18 | Compressed air source | 19 | Liquid discharge hose |
| 20 | Liquid holding pond | 21 | Inlet check valve |
| 22 | Pump control | 23 | Exterior liquid |
| 24 | Interior liquid | 25 | Inlet check valve screen |
| 26 | Check valve ball | 27 | Crossbar |
| 28 | Check valve ball seat | 29 | Discharged liquid |
| 30 | Tee | 31 | 90° elbow |
| 32 | Floating ball seat | 33 | Air-exclusion valve |
| 34 | Floating ball | 35 | Opening in air-exclusion valve seat |
| 36 | Screened floating ball cage | 37 | Protective cap |
| 38 | Air opening in protective cap | 39 | Fluid Passage |
| 40 | U-shaped fitting | 42 | Y-shaped fitting |
| 44 | Y-fitting passage | 49 | Threaded opening in bottom of pump casing |
| 51 | Threaded plug | 52 | Variable air regulator |
| 54 | Gauge | 56 | Regulated air line |
| 58 | Biasing actuator | 60 | Cycle reset valve |
| 62 | Cycle reset actuator | 64 | Air line |
| 68 | Timer reset air line | 70 | Compressed air supply line |
| 71 | Timer actuator port | 72 | Pneumatic timer |
| 74 | Pneumatic timer output air line | 76 | Pump air valve actuator |
| 78 | Back pressure regulator | 79 | Gauge |
| 80 | Pump valve air supply line | 82 | Pump air valve |
| 86 | Pneumatic canister pump with air-exclusion valve | 90 | Air line |
| 96 | Electrical cable | 98 | Electric proximity switch |
| 99 | Magnet | 100 | Float guide |
| 101 | Float | 102 | Solenoid valve |
| 103 | Low voltage power source | 104 | Air line |
| 105 | Electric wires | 108 | Air line |
| 111 | Pressure transducer air line | 112 | Solenoid valve |
| 113 | Pressure transducer | 114 | Air line |
| 130 | Air line | 131 | Air line |
| 132 | Two-position three-way pump air valve | 134 | Exhaust mode actuator |
| 136 | Pressure mode actuator | 138 | Air line |
| 140 | Pneumatic proximity switch | 142 | Float |
| 143 | Float Guide | 144 | Magnet |
| 146 | Float stop | 148 | Pneumatic proximity switch exhaust air line |
| 150 | Offset section of discharge pipe | 152 | Casing centerline |
| 160 | Air-exclusion valve manifold block | 162 | Threaded discharge pipe |
| 165 | Center bore | 167 | Threads |
| 169 | Threads | 170 | Radial cross bore |
| 171 | Threads | 173 | Threaded plug |
| 175 | Internal liquid passage | 180 | Large vertical bore |
| 183 | Small vertical bore | 185 | Ball seat |
| 187 | Threads | 188 | Section line |
| 190 | Threaded nipple | 195 | Threaded coupling |
| 196 | Threads | 197 | Air opening |
| 198 | Casing penetration | 210 | Threaded inlet check valve |
| 215 | Threaded ball cage | 216 | Protective cap |
| 217 | Threads | 218 | Screen |
| 220 | Floating ball | 250 | Quick-passage check valve |
| 260 | Sinking ball | 265 | Ball seat |
| 267 | Quick-passage check valve cross bar | 270 | Air-exclusion valve cross bar |
| 285 | Non-perforated area of exclusion valve | | |

DETAILED DESCRIPTION

FIG. 1—Prior Art—Bottom-Loading Submersible Pneumatic Canister Pump

FIG. 1 shows a typical prior-art pneumatic submersible canister pump currently used in many industries. While such a pump is inexpensive to make, usually only has two internal moving parts, is easy to understand and use, and is very durable, problems arise when the controls for the pump allow compressed air to pass out of the pump with the discharged fluid. Pneumatic submersible canister pump 12 is submerged in exterior liquid 23 to be pumped. It consists of a sealed pump casing 11 with an upper and a lower end, an interior and exterior and an opening 13 for compressed air to enter and exhaust air to exit casing 11. An inlet check valve 21 allows exterior liquid 23 to enter casing 11, but does not allow interior liquid to be discharged 24 to exit. A discharge check valve 17 allows interior liquid 24 to exit casing 11, but does not allow discharged liquid 29 to enter. A discharge pipe 15 extends from near the bottom of casing 11 up through the top of casing 11 with discharge check valve 17 attached at the upper end. Liquid discharge hose 19 carries discharged liquid 29 from pump casing 11 to a discharge point, such as a liquid holding pond 20. A two-timer pump control 16, supplied with compressed air from compressed air source 18, alternately pressurizes and exhausts the interior of pump casing 11.

Such a pump is typically operated using two timers. One timer controls the time to exhaust pressurized air from the interior of pump casing 11 to allow pump casing 11 to fill with interior liquid 24, while the other timer controls the time to pressurize the interior of casing 11 and force interior liquid 24 from inside casing 11. A fill-time setting may be from 3 to 30 seconds or even longer. The discharge time is usually in the same range. A person skilled in pump design is able to initially select the most appropriate settings, depending upon the back pressure in liquid discharge hose 19, pump submergence, fluid flow, air pressure, the size of the pump, and other factors. These factors can vary site to site and even well to well and they can change over time. The operating pressure for pumps on landfill sites, for example, typically ranges between 40 and 100 psi. However, the operating pressures can be higher for sites with deep water tables and/or high back pressure in liquid discharge line 19. Clean Environment Equipment of Oakland, Calif. designed pneumatically-driven down-well pumps to operate at over 150 psi.

When two-timer pump control 16 is in its exhaust cycle and the interior of casing 11 has a lower pressure than the hydrostatic pressure applied by exterior liquid 23 at inlet check valve 21, exterior liquid 23 enters casing 11 through check valve 21. Exterior liquid 23 passes into an inlet check valve screen 25 by lifting check valve ball 26 from inlet check valve ball seat 28. Check valve ball 26 is prevented from traveling into pump casing 11 by a crossbar 27. Air inside casing 11 is displaced through opening 13 in casing 11 and up air hose 14. For clarification in this disclosure exterior fluid 23 becomes interior liquid 24 upon exiting inlet check valve 21 and interior liquid 24 becomes discharged liquid 29 upon exiting outlet check valve 17. When casing 11 is filled with interior liquid 24, two-timer pump control 16 eventually switches to its pressurization cycle and allows pressurized air, supplied by compressed air source 18, to flow through air hose 14 and enter casing 11 through opening 13

When the pressure in casing 11 exceeds the hydrostatic pressure of exterior liquid 23 and the back pressure in discharge hose 19, interior liquid 24 in casing 11 moves check valve ball 26 onto check valve ball seat 28 in inlet check valve 21 to prevent interior liquid 24 from exiting. Interior liquid 24 is forced up through discharge pipe 15, through discharge check valve 17 by lifting check valve ball 26 from seat 28 and into discharge hose 19, where it becomes discharged liquid 29.

Eventually pump control 16 exhausts the pressurized air from casing 11, allowing exterior liquid 23 to again enter inlet check valve 21.

By repeating the exhaust and pressurization cycles, exterior liquid 23 is moved to another location, such as holding pond 20. Discharge check valve 17 operates as inlet check valve 21 for allowing liquid flow to move in one direction only. Crossbar 27 prevents ball 26 from traveling into discharge hose 19 and discharged liquid 29 is prevented from passing through discharge check valve 17 and entering pump casing 11 by ball 26, which rests on seat 28.

This design has numerous disadvantages. Compressed air can exit pump casing 11 via discharge pipe 15 if pump control 16 continually supplies compressed air into casing 11 after the level of interior liquid 24 has fallen to the lower end of discharge pipe 15. However carefully timers are set when a pump is installed, changes in discharge hose back pressure, submergence, compressed air purity, and liquid viscosity can result in such timer settings being too long or too short. Pneumatic timers are especially susceptible to failure and timing changes due to their dependence on the purity of compressed air and temperature. Pushing compressed air out of discharge pipe 15 with interior liquid 24 mixes oxygen with discharged liquid 29 and that can cause deposition of suspended and dissolved solids. It can also cause fume-laden compressed air to exhaust into the atmosphere at holding pond 20. Further, it can cause turbulence in discharged liquid 29 in discharge hose 19 and at holding pond 20, which may cause adverse chemical reactions and unwanted solid suspension in discharged liquid 29.

Figure 2:
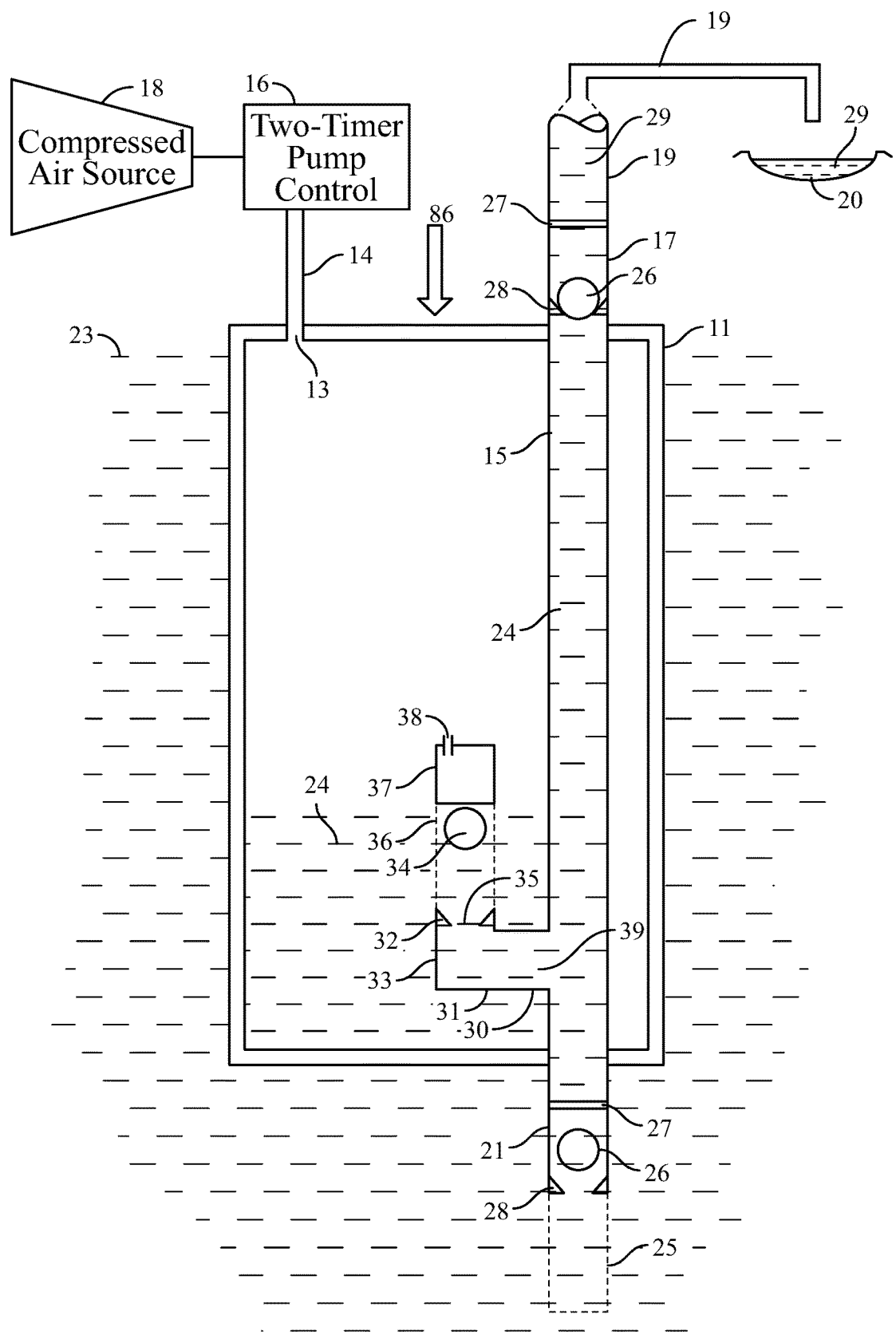
FIG. 2 shows a schematic view of a bottom-loading submersible pneumatic canister pump with a two-timer pump control currently in use in many industries with the addition of an air-exclusion valve connected to the pump discharge pipe via a tee and 90° elbow fitting near the bottom of the pump.

FIG. 2—Bottom-Loading Submersible Pneumatic Pump with Air-Exclusion Valve

FIG. 2 shows a pneumatic canister pump with an air-exclusion valve 86 in a bottom-loading configuration according to a first embodiment. Pump 86 is submerged in exterior liquid 23 for the purpose of pumping such liquid out of its holding vessel (not shown), such as a well. Pump 86 has an air-exclusion valve 33 and a fluid passage 39 for allowing interior liquid 24 to travel between discharge pipe 15 and air-exclusion valve 33. Air-exclusion valve 33 consists of a floating ball 34 that has a density less than interior liquid 24; a floating ball seat 32; a screened floating ball cage 36; a protective cap 37 with an air opening 38. Air-exclusion valve 33 is in fluid connection with discharge pipe 15 via a 90° elbow 31 and a tee 30. The other opening of tee 30 is attached to inlet check valve 21. Two-timer pump control 16 and compressed air source 18 are the same as in FIG. 1.

Pump 12 operates as follows: When the interior of pump casing 11 has a lower pressure than the hydrostatic pressure applied by exterior liquid 23 at inlet check valve 21, exterior liquid 23 enters pump casing 11 first through screened inlet 25 and then through inlet check valve 21. Check valve ball 26 lifts off seat 28 allowing flow into pump casing 11. Crossbar 27 prevents check valve ball 26 from traveling into pump casing 11. Interior liquid 24 travels through tee 30, fluid passage 39, and elbow 31 and flows up through opening in air-exclusion valve ball seat 35. Interior liquid 24 carries floating ball 34 up into screened cage 36 and into protective cap 37, where it is shielded from liquid drag forces when interior liquid 24 is forced from the interior of casing 11. Screened cage 36 confines floating ball 34 and allows floating ball 34 to move freely upward and downward and be directed toward seat 35 as the level of interior liquid 24 approaches air exclusion valve 33 when interior liquid 24 is being discharged. Cap 37 has a small air opening 38 for allowing air to escape. Interior liquid 24 flows out of screened cage 36 into casing 11. As interior liquid 24 rises in pump casing 11, the air inside pump casing 11 is exhausted through opening 13 and into air hose 14.

When pump casing 11 is filled with interior liquid 24, control 16 allows pressurized air supplied by compressed air source 18 to flow through air hose 14 and enter pump casing 11 through opening 13. Thus opening 13 constitutes an air passage means for allowing compressed air into pump casing 11 to pressurize the internal volume of pump casing 11. When the pressure in pump casing 11 exceeds the hydrostatic pressure of exterior liquid 23, ball 26 is forced onto seat 28, preventing interior liquid 24 from exiting through inlet check valve 21. Thus check valve 21 is a check valve means for allowing exterior liquid 23 into pump casing 11, but not allowing interior liquid 24 out. When the air pressure in pump casing 11 exceeds the back pressure in discharge hose 19, interior liquid 24 in casing 11 is forced through screened ball cage 36, down through opening in air-exclusion valve seat 35, through elbow 31, through fluid passage 39 and tee 30, into discharge pipe 15, and up and out of casing 11 through discharge check valve 17, and into discharge hose 19.

Discharge check valve 17 acts like inlet check valve 21 to allow flow in only one direction in that ball 26 rises off seat 28 when interior liquid 24 flows in the direction from seat 28 to crossbar 27 and prevents discharged liquid 29 from flowing into casing 11 due to ball 26 resting on seat 28. Thus check valve 17 is a check valve means for allowing interior liquid 24 out of pump casing 11 and preventing discharged liquid from flowing into casing 11. As the level of interior liquid 24 falls in pump casing 11 to the level of ball seat 32, floating ball 34 leaves protective cap 34 and floats downward and eventually rests on ball seat 32, preventing interior liquid 24 and any compressed air from entering discharge pipe 15. Air-exclusion valve 33 is an air exclusion means that prevents air from exiting pump 86 and mixing with discharged liquid 29. Since ball 34 resting on seat 32 prevents interior liquid 24 and compressed air from leaving casing 11, the air pressure in casing 11 increases toward that being delivered by compressed air source 18 unless compressed air is exhausted immediately. This increase in pressure is of little consequence in this embodiment, but will be shown to be of great use in subsequent drawing descriptions.

Eventually control 16 exhausts the compressed air from pump casing 11 out of opening 13 and casing 11 can again fill. Thus opening 13 constitutes an air passage means for allowing compressed air out of pump casing 11 to depressurize the internal volume of pump casing 11. By repeating the exhaust and pressurization cycles, exterior liquid 23 is moved to another location such as holding pond 20. Two-timer control 16 is a control means for pressurizing and exhausting the interior of casing 11.

Because air exclusion valve 33 closes when pump 86 is nearly empty, compressed air cannot leave casing 11 and mix with discharged liquid 29. This is has many advantages over the prior art, including:

Turbulence in discharge hose 19 is reduced so that suspended solids in discharged liquid 29 are not agitated into a more secure suspension.

Immiscible liquids, such as oil and water, are not churned together to form a suspension or dissolve the constituents of one into the other.

Oxygen interaction with discharged liquid 29 is reduced so the formations of depositions from the oxygenation of dissolved and suspended minerals, such as iron, in discharged liquid 29 is reduced. Such depositions can clog discharge pipe 15, foul discharge check valve 17, and clog discharge hose 19. If discharged liquid 29 contains volatile hydrocarbons, the introduction of oxygen may create a flammable environment.

Gas releases at holding pond 20 are reduced, so that release of hydrocarbons into the atmosphere is lessened.

Compressed air, energy and air compressor capacity are conserved by not discharging compressed air into discharged liquid 29.

Other piping and machined part arrangements are capable of the same performance to one familiar with the piping and liquid flow arts. An example of this is that certain types of check valves, such as duckbill-type, swing-type and flapper-type can be used in place of some of the check valves shown herein as ball-type check valves.

Figure 3:
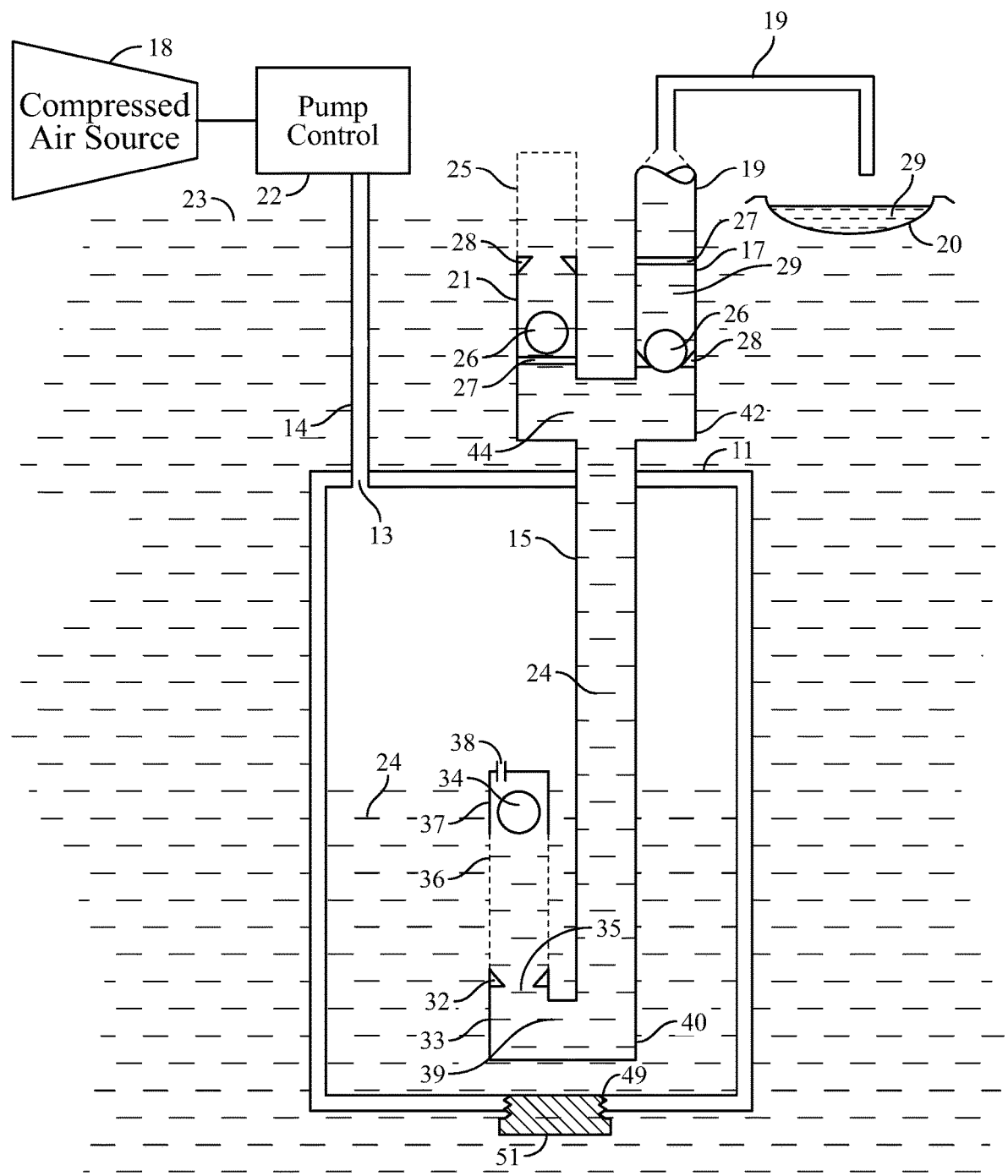
FIG. 3 shows a schematic view of a top-loading submersible pneumatic canister pump with a generic pump control with a Y-shaped fitting at the top of the pump holding the inlet and discharge check valves and with an air-exclusion valve connected via a U-shaped fitting on the bottom of the discharge pipe.

FIG. 3—Top-Loading Submersible Pneumatic Canister Pump with Air-Exclusion Valve

Figure 4:
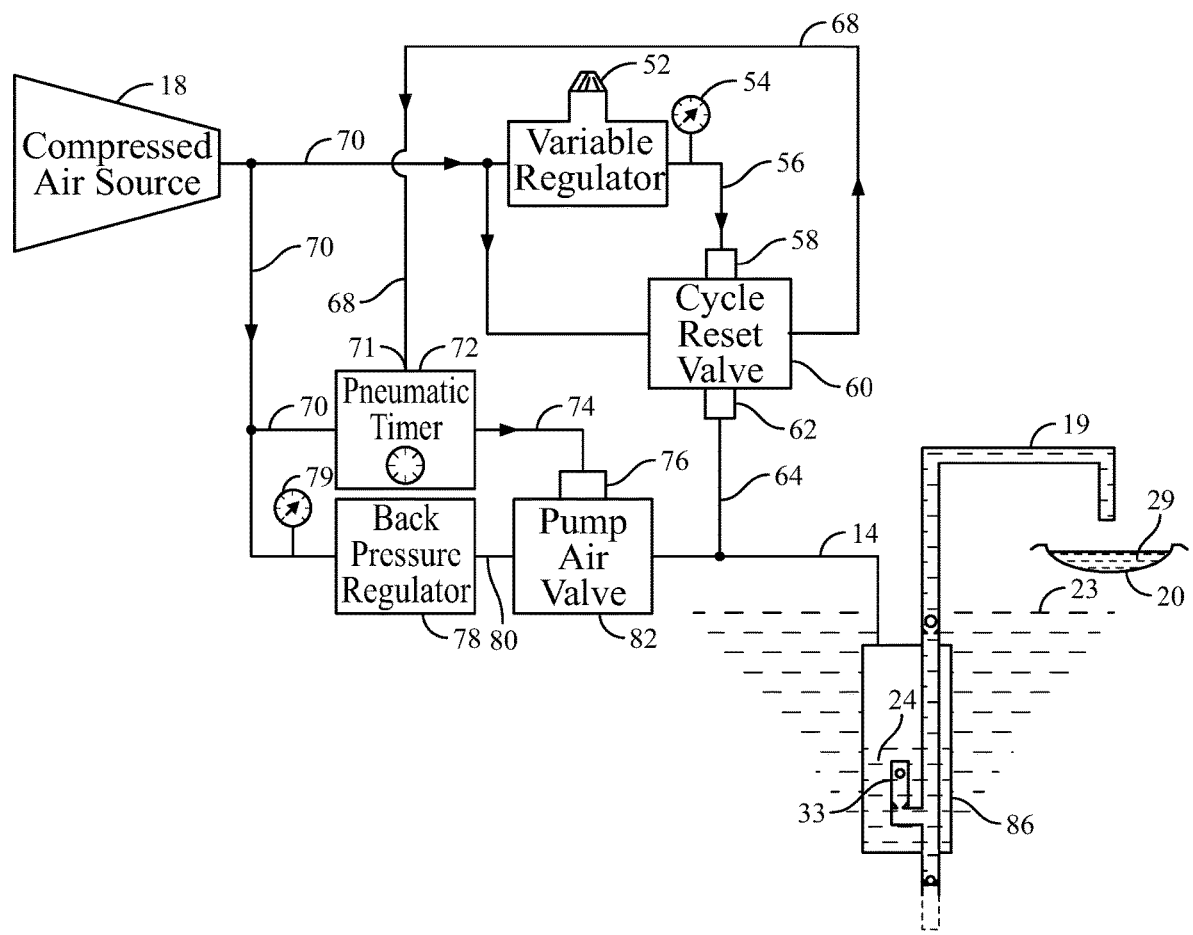
FIG. 4 shows a pneumatic schematic of a control system with only one timer that can be used to operate a submerged submersible pneumatic canister pump containing an air-exclusion valve.

FIG. 3 shows my submersible pneumatic pump in a top-loading embodiment submerged in liquid 23. This embodiment is similar to that of FIG. 2, except that inlet check valve 21 and discharge check valve 17 are both located in a Y-shaped fitting 42 attached to the top of discharge pipe 15. The bottom of pump casing 11 is sealed. Fitting 42 has a passage 44 below both inlet check valve 21 and discharge check valve 17. Passage 44 allows interior liquid 24 to pass downward from inlet check valve 21 into discharge pipe 15 during the exhaust cycle of casing 11 and upward from discharge pipe 15 and out of discharge check valve 17 during the pressurization cycle of the interior of casing 11. Discharge pipe 15 is fluidly connected with air-exclusion valve 33 via a U-shaped fitting 40. Pump control 22 is shown as generic as it can be a two-timer control or one such as shown in FIG. 4.

When the level of exterior liquid 23 is above the inlet to check valve 21 and the interior of casing 11 has a lower pressure than the pressure applied by exterior liquid 23 at valve 21, exterior liquid 23 enters casing 11 first through screened inlet 25 and then through inlet check valve 21. Ball 26 is moved from seat first through screened inlet 25 and then through inlet check valve 21. Ball 26 is moved from seat 28 by the flow of exterior liquid 23. Ball 26 is prevented from traveling into casing 11 by crossbar 27. Interior liquid 24 then flows down through pipe 15 and up through valve 33 that is attached to the lower end of pipe 15 via U-shaped fitting 40. Air inside casing 11 is exhausted through opening 13 and into air hose 14. As interior liquid 24 passes through valve 33 through opening 35, ball 34 lifts from seat 32. Ball 34 is of lower density than interior liquid 24 so it floats on interior liquid 24. As the level of interior liquid 24 rises inside casing 11, ball 34 is carried upward into screened cage 36 to protective cap 38 that has a small opening 38 for allowing air to escape.

During the discharge cycle pump control 22 causes pressurized air supplied by compressed air source 18 to flow through air hose 14 and enter casing 11 through opening 13. When the pressure in casing 11 exceeds the pressure of exterior liquid 23 and back pressure in discharge hose 19, interior liquid 24 is forced back through opening 35, through U-shaped fitting 40, and up pipe 15. Ball 26 is carried onto seat 28, preventing interior liquid 24 from exiting valve 21. Interior liquid 24 in casing 11 is forced up and out of casing 11 through valve 17 and into hose 19. As the level of interior liquid 24 falls to the level of seat 32, ball 34 travels downward and eventually rests on seat 32, preventing interior liquid 24 and any compressed air from entering pipe 15. Due to the sealing of casing 11 by ball 34 on seat 32, the air pressure in casing 11 continues to increase toward that of the compressed air supplied by pump control 22. Eventually pump control 22 exhausts compressed air from hose 14 and subsequently out of opening 13. Casing 11 can then again fill. By repeating the exhaust and pressurization cycles, exterior liquid 23 is moved to another location, such as holding pond 20.

The bottom of casing 11 is shown having a threaded opening 49 with threaded plug 51 sealing threaded opening 49. Threaded plug 51 can be removed and the outlet end of another inlet check valve 21 can be threaded into opening 49 to create a bottom-and-top-loading pump configuration. If only a bottom-loading configuration is desired, inlet check valve 21 can be removed from fitting 42 and attached at opening 49, Y-shaped fitting 42 can be removed from pipe 15, and outlet check valve 17 can be attached to the top of pipe 15. Thus the design is versatile.

The advantages of this arrangement are the same as described in connection with FIG. 2 and are even more important. This is because the top-loading configuration using Y-shaped fitting 42 was designed and used for years by Clean Environment Equipment, supra, to capture lighter, immiscible liquids, such as gasoline and diesel oils, along with water upon which they float. Such lighter liquids can be flammable and contain harmful chemicals, such as benzene, that can dissolve in water. Also they are harmful when released into the atmosphere. Thus the reductions in turbulence, oxygen interaction, and escaping gases are especially important.

Other piping and machined part arrangements are capable of the same performance, as will be recognized by one familiar with the piping and liquid flow.

FIG. 4—Control Schematic for Submersible Pneumatic Canister Pump with Air-Exclusion Valve FIG. 4 shows a schematic of a circuit that comprises a control means to control the pumping from a submersible pneumatic canister pump 86 containing an air-exclusion valve 33. In the embodiments shown air exclusion valve 33 comprises a check valve having a buoyant ball that closes off the discharge passage of fluids by descending with the surface of fluid inside pump 86 to reside on a seat when pump 86 is nearly empty of such fluids. Pump 86 is submerged in exterior liquid 23. Pump 86 is constructed and operates the same as shown in FIG. 2.

The control means for controlling submersible canister pump with air-exclusion valve 86 comprises compressed air source 18, regulator 52, cycle reset valve 60, pneumatic timer 72, spring return valve 82 and operable connected air lines 14, 56, 64, 68, 70, and 74.

The circuit includes compressed air source 18, variable air regulator 52 that provides a desired pressure that determines the start of the exhaust cycle, and cycle reset valve 60 which in this case is a two-position, three-way valve. Valve 60 has biasing actuator 58 that is pressurized by air from regulator 52, and cycle reset actuator 62 that is pressurized by pump air hose 14 through air line 64. Pressure gauge 54 reads the bias pressure applied to actuator 58. A single pneumatic timer 72 is utilized in this design versus two timers such as used currently in the industry. Timer 72 is shown as pneumatic but can also be electric.

Pneumatic timer 72 delays pressurized air from passing to pump air valve actuator 76 until a desired time has expired. This allows time for canister pump 86 to fill. This time is typically adjustable from 1 to 30 seconds and is set based upon the particular parameters of the environment and pump use. For slow-flow operations, this time may be extended to many minutes. An electro-pneumatic timer can also be used for this purpose. Back pressure regulator 78 maintains a pressure in the circuitry that is above the minimum operating pressure of all components. The available pressure for control components can be read on gauge 79 with valve 82 open to atmosphere. Back pressure regulator 78 and gauge 79 are not necessary if the operation of pump 86 does not lower the air pressure below the minimum operating pressure of the pneumatic components. Gauge 54 is not required once variable regulator 52 is set or if the regulator used is not variable, but factory preset.

In this embodiment pump air valve 82 is a three-way, normally closed, spring return valve and is positioned between pump valve air supply line 80 and pump air line 14. Valve 82 prevents compressed air from passing to pump air line 14 until actuator 76 is pressurized during the pressurization cycle phase of pumping. After the pressurization phase actuator 76 is depressurized, valve 82 again prevents air from passing to pump air line 14 and simultaneously exhausts pump air line 14. Actuator 76 is pressurized by the output of timer 72 via pneumatic timer output air line 74.

Compressed air source 18 supplies air through compressed air supply line 70 to regulator 52, cycle reset valve 60, pneumatic timer 72, and back pressure regulator 78. Regulator 52 is set to a pressure that will allow discharged liquid 29 to be pumped to a desired destination, such as holding pond 20. Air line 56 conveys this pressure to actuator 58 that controls cycle reset valve 60. Cycle reset valve 60 passes compressed air through timer reset air line 68 to timer actuator port 71 until the air pressure at actuator 62, which is the pressure inside pneumatic canister pump with air-exclusion valve 86, is greater than the air pressure pressurizing actuator 58.

The controls begin operation when air line 70 is pressurized by compressed air source 18. Regulator 52 supplies compressed air to actuator 58, which shifts valve 60 to pass air to timer actuator port 71. This initiates the preset exhaust cycle of timer 72. During the exhaust cycle period no compressed air passes out of timer 72 to actuator 76, so valve 82 remains in exhaust position, allowing compressed air to exhaust from pump 86 via air hose 14. This allows submerged pump 86 to fill.

When the preset exhaust cycle period of timer 72 ends, timer 72 passes air into pneumatic timer output air line 74, pressurizing actuator 76, which causes valve 82 to open and pass compressed air through air hose 14 to pump 86. This causes interior liquid 24 in pump 86 to be forced out of pump 86 and discharged into discharge hose 19. When the level of interior liquid 24 in pump 86 reaches air-exclusion valve 33, valve 33 closes, preventing interior liquid 24 and compressed air from exiting pump 86, thereby causing the pressure in pump 86 and air hose 14 to rise (see FIGS. 2 and 3). Thus air-exclusion valve 33 is a float-sealing means for preventing compressed air from being discharged with interior liquid 24 from pump 86.

The pressure in hose 14 is transmitted via air line 64 to cycle reset actuator 62 of valve 60. When the pressure in line 64 exceeds the biasing pressure applied to actuator 58 by regulator 52, valve 60 shifts to exhaust the compressed air in air line 68, thus removing pressurized air from timer actuator port 71. This causes timer 72 to exhaust air from line 74, causing valve 82 to close and exhaust air from air hose 14 and pump 86. This allows pump 86 to again fill. As pressure in line 14 decreases below that exiting regulator 52, cycle reset valve 60 shifts, allowing compressed air to pass again to timer actuator port 71. This air pressure then activates timer 72 to begin timing the exhaust cycle. Thus the combination of regulator 52, actuator 58, cycle reset valve 60, and actuator 62 constitutes a preset activation pressure means which instigates the exhaust cycle of pump 86. Thus the pressurization and exhaust cycles are alternated automatically, moving exterior liquid 23 to holding pond 20. Hence such an arrangement of components comprises a pump control means to pressurize and exhaust pump 86.

In this embodiment timer 72 has been described as normally closed and designed to delay output of compressed air until a predetermined time cycle is completed. Timer 72 can also be normally open, so that it would pass air immediately upon being activated and shut off and exhaust the downstream air after a predetermined time cycle is completed. With this type of timer, pump air valve 82 would be a normally open, spring return, three-way pump air valve. The resulting pressurization and exhausting cycling of pump 86 would be the same.

Timer 72 and pump air valve 82 have been shown separately for the sake of clarity. Pump air valve 82, pump air valve sensor 76 and air line 74 could be eliminated if timer 72, which by design incorporates a three-way air valve, could pass sufficient compressed air to discharge pump 86 at a desired rate.

Suitable Air controls and valves are available from Clippard Instrument Laboratory, Inc. of Cincinnati, Ohio, and Norgren Inc. of Littleton, Colo. Pneumatic timers are available from Parker Hannifin Corporation of Cleveland, Ohio, Impulse Automation (formally H. Kuhnke, Ltd.) of Andover, UK and Ingersol Rand in Dublin, Ireland. Electric timers with solenoid valves are produced by Allenair Corporation of Mineola, N.Y.

This pneumatic control is an improvement over current canister pump controls in the following ways:

It uses only one timer, where normal canister pump controls need two. This reduces cost and maintenance.

The single timer used in the present embodiment controls only the exhaust cycle, not the pressure cycle. If the exhaust cycle is too long or too short, no problem is created, other than reduction in pump rate and some waste in compressed air. In a typical pump control for a canister pump both the exhaust and pressure cycles are controlled by timers. During the pressure cycle such a pump control will supply compressed air to the canister pump until the pressure timing cycle ends regardless if all fluid has been pushed from the canister pump. With such a pump controller compressed air can exit the pump along with the pumped fluid. The addition of an air-exclusion valve and fluid passages as presented herein prevents this from occurring.

In this embodiment of pneumatic circuitry the pressurization cycle is ended and the exhaust cycle is automatically begun without the chance of compressed air exiting with the liquid being pumped. Typical canister pump controls rely on a timer setting to regulate the pressurization cycle. Variations in compressed air pressure, humidity and purity, ground water levels, and liquid back pressure can cause such settings to over or under pressurize the canister pump. When this happens compressed air can be introduced into the liquid stream and is wasted. The negative effects of this have been listed previously.

The use of two timers has caused some systems to fail to pump liquids, thus defeating the use of the pump. In such a case, even if an operator knows there is liquid above the pump, it is difficult to tell if the pump has failed due to inlet check valve backflow. Utilizing this design an operator can tell without a gauge within one pressure cycle if the inlet check valve is operating properly and being pressurized sufficiently to move liquid to the desired location by listening to the force of the compressed air exhausting the control. Compressed air should exhaust with the same force as it did in the initial installation.

Other pneumatic, electro-pneumatic and electric component arrangements are capable of the same pressurization and exhaust cycling of a pump and are easily designed by those familiar with pneumatic circuitry. One example of this would be the use of a normally open timer that immediately passes air when connected to a compressed air source in combination with a normally open three-way pump air valve. Another example would be the elimination of the pump air valve and allow the timer to supply compressed air directly to the pump and exhaust compressed air from the pump. This is possible because timers by design incorporate three-way pneumatic valves to pass air downstream and exhaust air from downstream.

Figure 5:
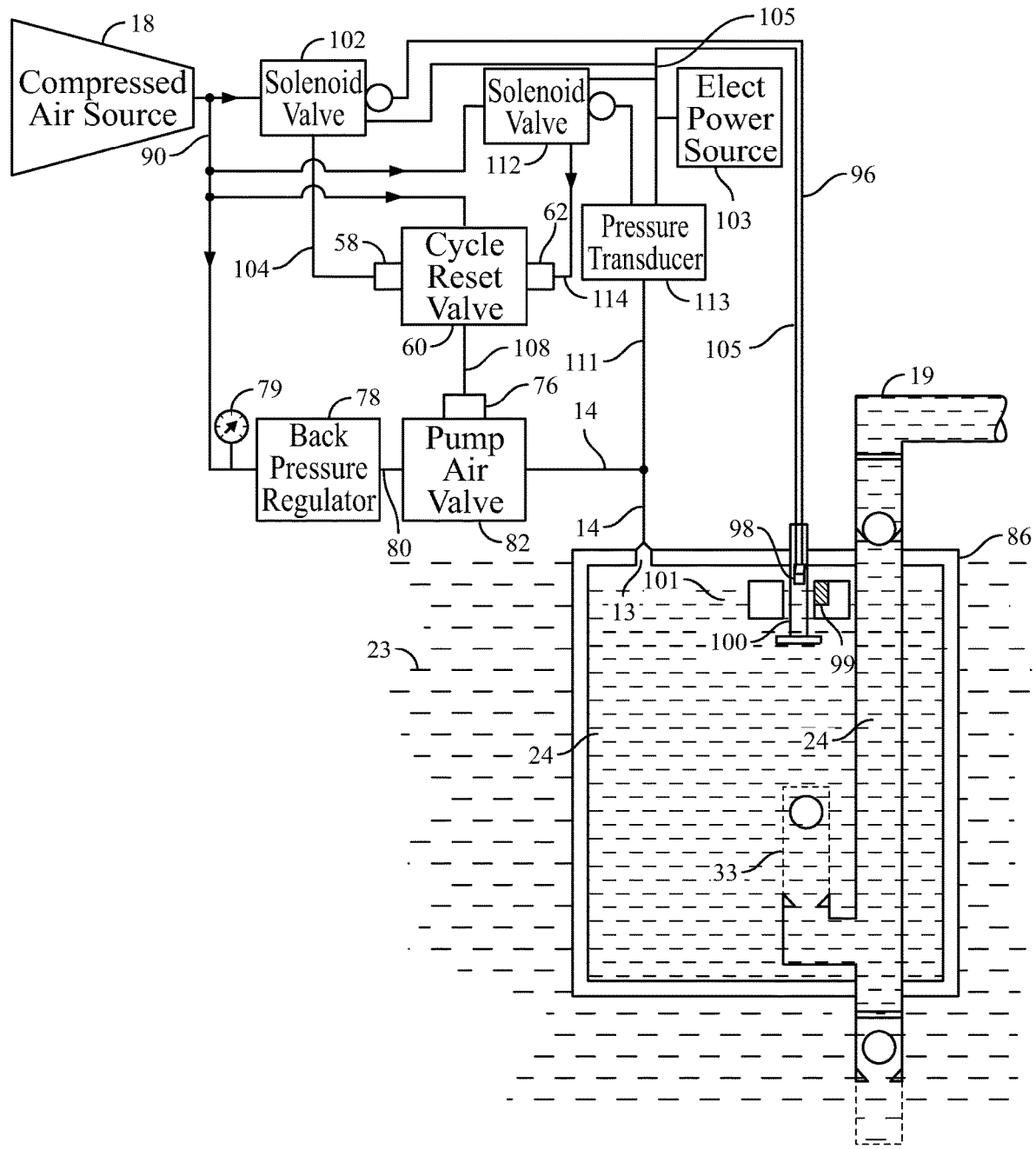
FIG. 5 shows a schematic of an electric/pneumatic control and a submersible pneumatic canister pump with an electric float switch and an air-exclusion valve.

FIG. 5—Electric/Pneumatic Control Schematic for Submersible Pneumatic Canister Pump with Air-Exclusion Valve and Float Switch FIG. 5 shows an electro-pneumatic system that can be used to control the pumping from a submersible pneumatically-driven canister pump with air-exclusion valve 86. Pump 86 is submerged in exterior liquid 23. Pump 86 is similar to the pump in FIG. 2. In addition, it has a float 101 with an internal magnet 99 that rides on a float guide 100 mounted near the upper end of the interior of pump 86. Pump guide 100 contains an electric proximity switch 98 that operates when float 101 approaches the top of float guide 100. Thus magnet 99 constitutes a switch means that that causes electric proximity switch 98 to operate when float 101 is in proximity with electric proximity switch 98. Float 101 with magnet 99, guide 100, and electric proximity switch 98 are shown internal to pump 86. These components can alternatively be located externally of pump 86.

The control system for pump 86 includes a low-voltage power source 103 and electric wires 105 that provides power to a pressure transducer 113, float switch 98, and electro-pneumatic three-way solenoid valves 102 and 112. Also included is compressed air source 18, a gauge 79 and a back pressure valve 78, pump air valve 82 with actuator 76, cycle reset valve 60 with actuators 62 and 58, and air lines 14, 80, 90, 104, 108, 111, and 114.

Before compressed air source 18 is connected to air line 90, pump air valve 82, which in this embodiment is a three-way, spring-return valve, is positioned via spring bias to exhaust compressed air from air hose 14. This allows exterior liquid 23 to enter pump 86. When pump 86 is nearly full, float 101 rises on float guide 100 bringing magnet 99 in proximity to electric proximity switch 98 inside float guide 100, causing electric proximity switch 98 to operate. The operation of electric proximity switch 98 causes solenoid valve 102 to open and connect air line 90 to air line 104. After compressed air source 18 is connected to air line 90, air passes through solenoid valve 102 and through air line 104 to pressure actuator 58. Actuator 58 shifts cycle reset valve 60, which in this embodiment is a two-position, three-way valve, to pass pressurized air through air line 108 to pump air valve actuator 76, causing pump air valve 82 to open. Pump air valve 82 passes pressurized air through hose 14 to pump 86, forcing interior liquid 24 out of pump 86 and into discharge hose 19.

As the level of interior liquid 24 falls in pump 86, float 101 falls to the bottom of float guide 100, returning proximity switch 98 inside float guide 100 to its original position. This causes valve 102 to close and exhaust the pressurized air in air line 104. This relieves pressure from actuator 58. Valve 60 remains in its shifted position until actuator 62 is pressurized. When the level of interior liquid 24 in pump 86 reaches air-exclusion valve 33, valve 33 closes to prevent air and interior liquid 24 from leaving pump 86, causing pressure in pump 86 and air hose 14 to rise. The pressure in air hose 14 is transmitted via air line 111 to transducer 113.

When sufficient pressure exists in air line 111, transducer 113 sends a signal to open solenoid valve 112, which passes compressed air to exhaust cycle actuator 62, causing cycle reset valve 60 to shift, since there is no pressure being exerted on actuator 58 from solenoid valve 102, exhausting pressurized air from line 108 and actuator 76. This closes pump air valve 82 and exhausts compressed air from air hose 14. This depressurizes pump 86, allowing exterior liquid 23 to again enter to begin the pumping cycle again. Thus the combination of pressure transducer 113, solenoid valve 112, cycle reset valve 60 and actuator 62 constitute a preset activation pressure means causing said compressed air to be exhausted from said sealed casing allowing exterior liquid 23 to be pumped to again enter pump 86.

Electric pressure transducers and electro-pneumatic valves are available through Omega Engineering Inc. of Stamford, Conn. Float switches with electric proximity switches in their guide rods are available through Madison Company in Branford, Conn.

The advantage of this pump control are as follows: There are no pneumatic timers, which saves in maintenance since pneumatic timers are sensitive to contaminants, such as oil, water and particles in compressed air. Also the pump control design can be made more robust and less expensive than those using timers by using common pneumatic valves and electro-pneumatic valves.

Other electric, pneumatic and electric/pneumatic component arrangements are capable of the same pressurization and exhaust cycling of a pump and are easily designed by someone familiar with pneumatic circuitry and electro-pneumatic components.

Figure 6:
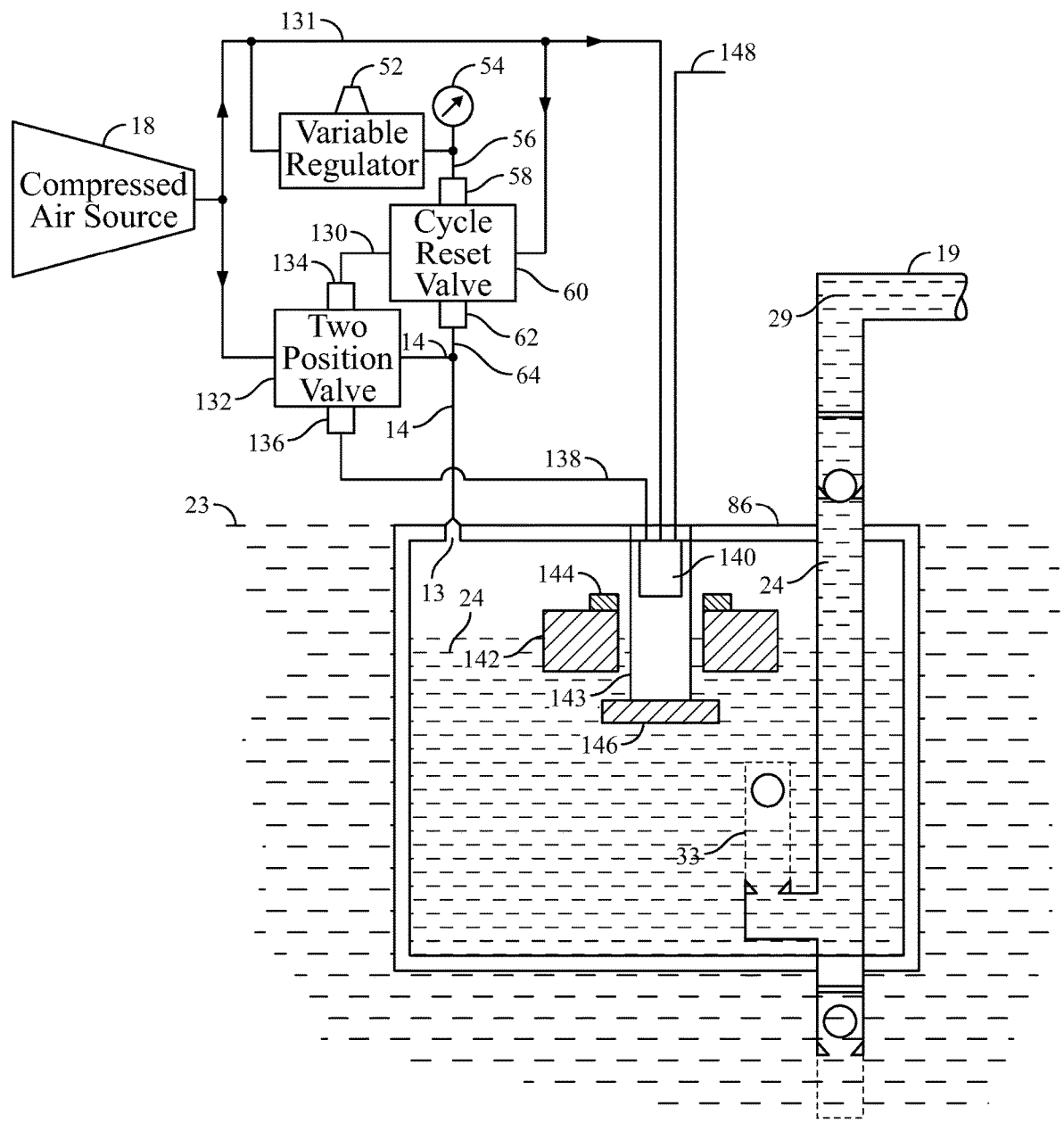
FIG. 6 shows a schematic of a pneumatic control and a submersible pneumatic canister pump with a pneumatic float switch and an air-exclusion valve.

FIG. 6—Pneumatic Control Schematic for Submersible Pneumatic Canister Pump with Air-Exclusion Valve and Float Switch FIG. 6 shows a schematic of my design of a pneumatic circuit that can be used to control the pumping from submersible pneumatic canister pump with an air-exclusion valve 86. The combination of components shown can alternately pressurize and exhaust the interior of pump 86, which is submerged in exterior liquid 23, thus pumping exterior liquid 23 to another location.

This control comprises compressed air source 18, two-position three-way pump air valve 132 with actuators 134 and 136, variable regulator 52, gauge 54, cycle reset valve 60 with actuators 58 and 62 and air lines 14, 56, 64, 130, 131, 138, and 148. There is no back pressure regulator or back pressure gauge shown, since they may not be necessary if compressed air source 18 can supply sufficient pressure and flow of air.

Pump 86 is similar to that in FIG. 2 with the exception that it has in addition float 142 with magnet 144 attached or riding on float guide 143. Float 142 with magnet 144 float on interior liquid 24 and follows the level of interior liquid 24. Float guide 143 is mounted near the upper end of the interior of pump 86. Located near the top of float guide 143 is pneumatic proximity switch 140 that pressurizes air line 138 when the level of interior liquid 24 rises, float 142 approaches the top of float guide 143 and brings magnet 144 in proximity to pneumatic proximity switch 140. When float 142 moves from the upper area of guide 143 due to the falling level of interior liquid 24, switch 140 exhausts the compressed air in air line 138 out of pneumatic proximity switch exhaust air line 148. Thus magnet 144 constitutes a switching means incorporated into float 142 that operates pneumatic proximity switch 140 when float 142 is in proximity with switch 140. Float 142 with magnet 144, guide 143, and pneumatic proximity switch 140 are shown internal to pump 86. These components can alternatively be located externally of pump 86.

Compressed air source 18 supplies compressed air through air line 131 to pump air valve 132, regulator 52, cycle reset valve 60, and pneumatic proximity switch 140. Regulator 52 is set to a pressure that will allow exterior liquid 23 to be pumped by pump 86 to a desired discharge location. That pressure is read on gauge 54.

When compressed air source 18 is connected to air line 131, compressed air flows from regulator 52, through regulated air line 56 to actuator 58, shifting reset valve 60 and causing air line 130 to exhaust and remove air pressure from actuator 134. If valve 132 is initially in exhaust mode, the air pressure in hose 14 will be exhausted and exterior liquid 23 can enter pump 86. When pump 86 is nearly full, float 142 will rise from float stop 146 and travel up float guide 142 to position magnet 144 close to pneumatic proximity switch 140, causing switch 140 to pass compressed air through air line 138. The compressed air in air line 138 pressurizes actuator 136, shifting pump air valve 132 to pass compressed air into hose 14 and pressurize the interior of pump 86. This moves interior liquid 24 out of pump 86.

As the level of interior liquid 24 falls in pump 86, float 142 falls and moves magnet 144 away from switch 140. Switch 140 then exhausts the air in air line 138 and removes pressure from actuator 136. Valve 132 continues to pass compressed air to pump 86 until actuator 134 is pressurized. When the level of interior liquid 24 in pump 86 reaches valve 33, valve 33 closes to prevent air and interior liquid 24 from leaving pump 86. This causes the air pressure in pump 86 and air hose 14 to rise. This pressure is transmitted via air line 64 to actuator 62.

After the pressure in air line 64 rises sufficiently to overcome the preset pressure coming from regulator 52 into actuator 58, cycle reset valve 60 shifts to allow compressed air to flow through air line 130 to actuator 134, shifting pump air valve 132 to exhaust air from air hose 14. This allows pump 86 to again fill. Thus the combination of regulator 52, cycle reset valve 60 and actuators 58 and 62 constitute a preset pressure sensing means causing said compressed air to be exhausted from said sealed casing allowing said liquid to be pumped to again enter said pump.

If, when compressed air source 18 pressurizes air line 131, valve 132 is initially in position to pass compressed air to pump 86 through hose 14, pump 86 will not fill because the air inside is not able to leave via hose 14. In this case the first cycle will be a pressure cycle, once compressed air source 18 is connected to the system. The air delivered to pump 86 through hose 14 will force interior liquid 24 that is in pump 86 out, lowering the level of interior liquid 24. This will cause float 142 to move downward, in turn causing pneumatic proximity switch 140 to exhaust air line 138 and removing air pressure from actuator 136. When the level of interior liquid 23 falls to the level of valve 33, valve 33 will close, causing the pressure inside of pump 86 to rise. The pressure in pump 86 and air hose 14 will rise until the pressure in line 64 pressurize actuator 62 sufficiently to overcome the air pressure in air line 56, shifting cycle reset valve 60 to pressurize actuator 134 through air line 130. This causes valve 132 to shift and exhaust hose 14, allowing the interior of pump 86 to depressurize and again fill. The exhaust cycle will continue until the level of interior liquid 24 in pump 86 raises float 142 near the top of float guide 146. The exhaust and pressurization cycles are thus automatically alternately operated causing pump 86 to pump exterior liquid 23.

Magnetically actuated proximity valves are available through Impulse Automation, Ltd., supra.

Advantages:
  The pump control has no timers, thus reducing initial costs and maintenance.

The pump control contains only two air valves, which are normally more robust than other designs that include timers.

The pump and control system is totally pneumatic and thus no electrical source is required. Electrical power can be hazardous, especially in areas with possible flammable atmospheres or liquids, such as on a refinery.

In addition the control can be made very compact and relatively simple so assembly and maintenance costs are reduced.

Other pneumatic component arrangements are capable of the same pressurization and exhaust cycling of a pump and are easily designed by someone familiar with pneumatic circuitry.

Figure 7:
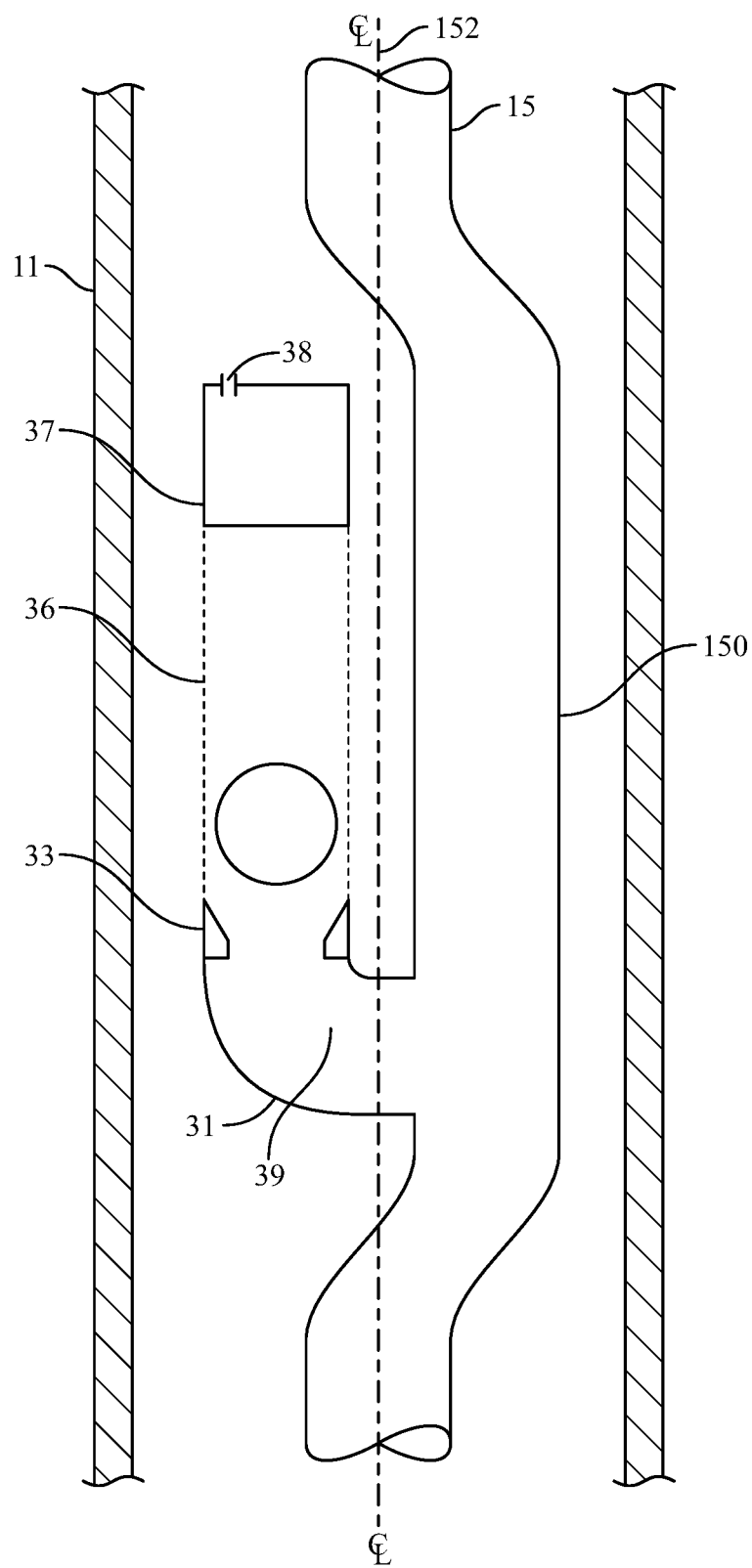
FIG. 7 shows an offset section of the discharge pipe in the area of the air-exclusion valve for allowing the discharge pipe to be centered in the pump casing.

FIG. 7—Offset Discharge Pipe

FIG. 7 shows an embodiment of discharge pipe 15 that enables easier and less expensive manufacturing and servicing of the pump 86 since the ends of the discharge pipe are centered within casing 11. A portion of discharge pipe 15 is offset to accomplish this. Air-exclusion valve 33 is constructed and operates as described in FIGS. 2 and 3. Discharge pipe 15 is offset in the area of air-exclusion valve 33 to allow discharge pipe 15 to be aligned with casing centerline 152 above and below air-exclusion valve 33. Offset section of discharge pipe 150 is connected to air-exclusion valve 33 via 90° elbow 31 creating fluid passage 39.

The advantage of offsetting discharge pipe 15 in the area of air-exclusion valve 33 is that it positions discharge pipe 15 in the center of casing 11 at the bottom and top of casing 11. It thus allows the use of off-the-shelf parts, because most pneumatic pumps have discharge tube 15 aligned with the centerline 152 of the casing 11. It also makes the machining of the top and bottom ends of a pump easier, as the largest hole is centered and can be bored on a lathe.

Offset section 150 can be made as a separate part and installed in a standard canister pump that would accommodate the extra section by merely shortening discharge pipe 15 or lengthening casing 11. Offset section 150 can be attached to discharge pipe 15 by threads, welding or other means.

Figure 8A:
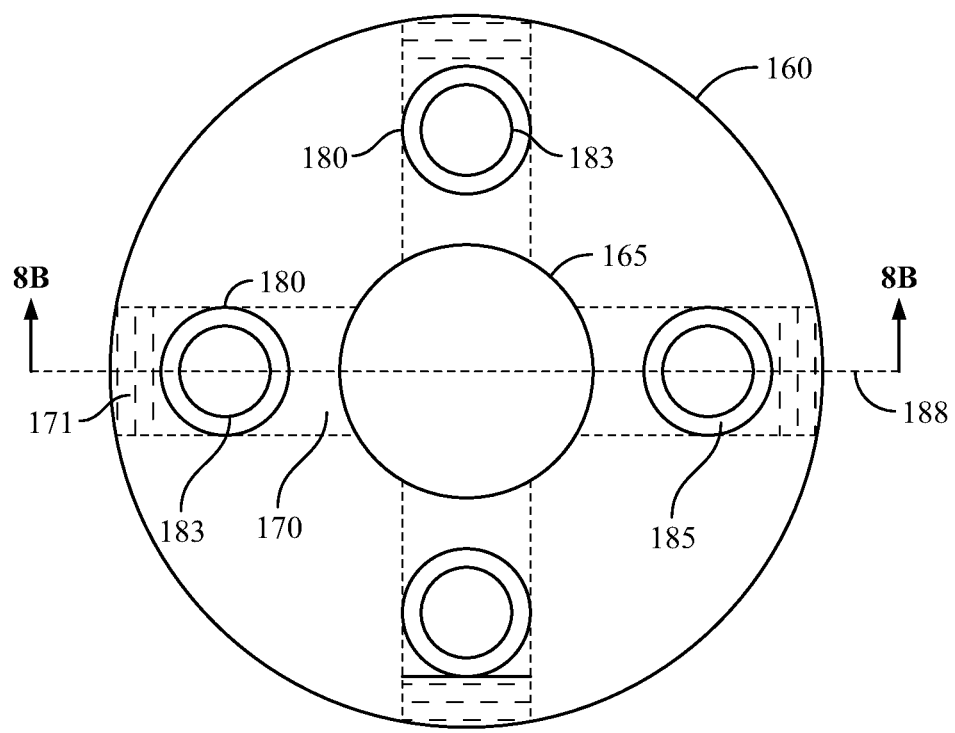
FIGS. 8A and 8B show air-exclusion valves configured radially for allowing the discharge pipe to be centered in the pump casing.
Figure 8B:
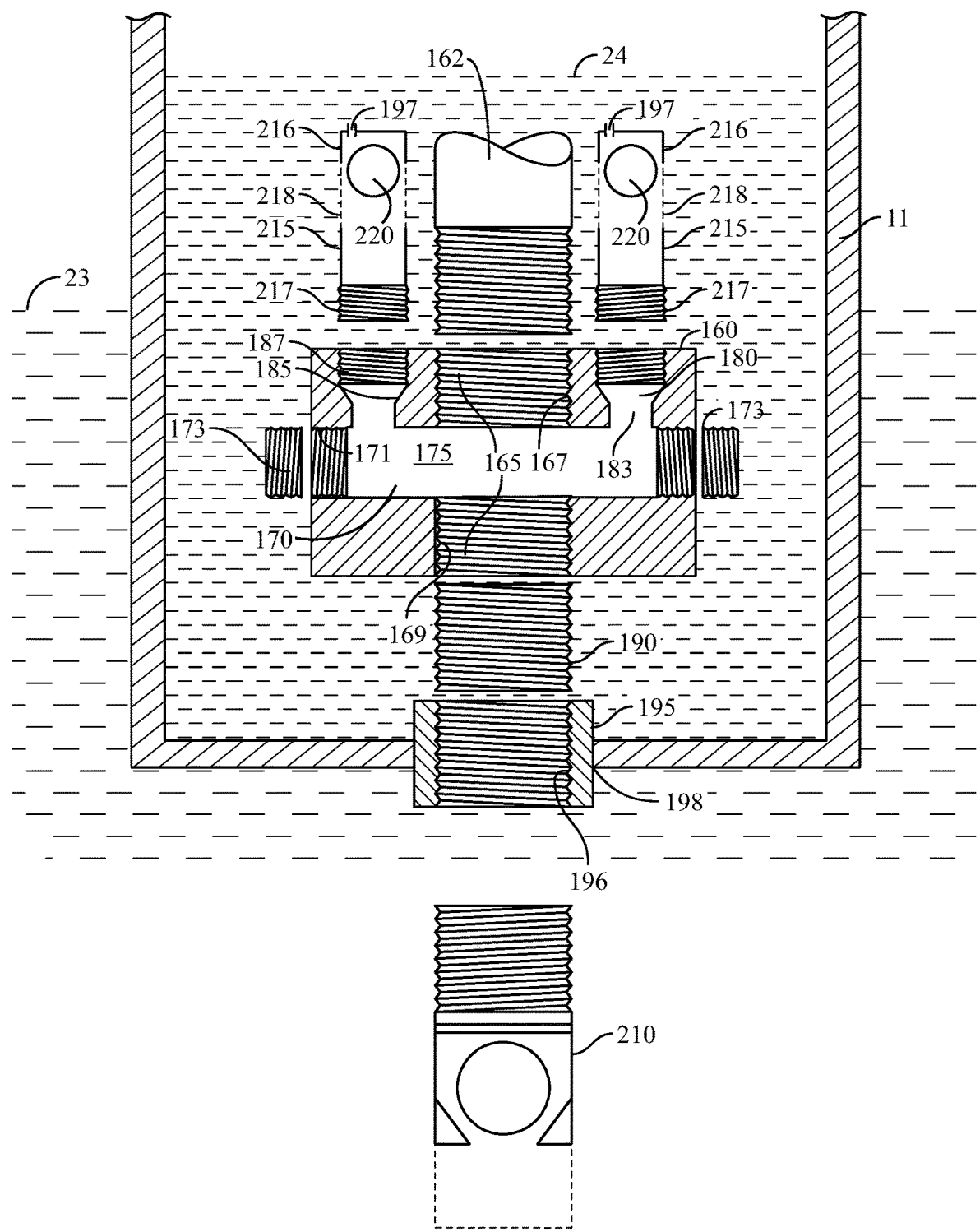

FIGS. 8A and 8B—Radial Air-Exclusion Valve

FIGS. 8 A and 8B show a design which allows discharge pipe 15 to be centered in casing 11 without having to create an offset section as shown in FIG. 7. FIG. 8A shows a top view of an air-exclusion valve manifold block 160 that is bored at several locations Section line 188 indicates the plane on which FIG. 8B is taken.

Air-exclusion valve manifold block 160 contains center bore 165. Bored radially inward around the exterior of air-exclusion valve manifold block 160 are several of radial cross bore 170. The extremity of each radial cross bore 170 contains threads 171. Several of small vertical bores 183 are formed around the periphery of the upper face of block 160 with each concentrically located within one large vertical bores 180. Each of the small bores 183 intersects a cross bores 170, which intersects with center bore 165. The base of large bore 180 creates ball seat 185.

FIG. 8B shows a sectioned side view of air-exclusion valve manifold block 160 in exploded assembly within pump casing 11. A sectional view of threaded ball cage 215 is shown above mating threads 187 located at the upper end of large vertical bore 180. Floating ball 220 is shown inside threaded ball cage 215. Threaded ball cage 215 is shown with screen 218, threads 217, and protective cap 216 with air opening 197. Threaded discharge pipe 162 is shown above mating threads 167 located at the upper end of center bore 165. Threaded nipple 190 is shown below mating threads 169 in the lower end of center bore 165 and above threaded coupling 195. Threaded coupling 195 is secured and sealed in pump casing 11 through casing penetration 198. Threaded inlet check valve 210 is shown in exploded view below mating threads 196 in threaded coupling 195. Threaded plug 173 is shown adjacent to mating threads 171 located at the outer end of cross bore 170.

Center bore 165 passes through block 160 and has threads 167 and threads 169 located at the top and bottom ends respectively. Radial cross bore 170 intersects with small vertical bore 183 and center bore 165, forming internal liquid passage 175 which permits interior liquid 24 to flow between center bore 165 and bore 183. Large vertical bore 180 is concentric with small vertical bore 183 and does not extend sufficiently to intersect cross bore 170, thus forming ball seat 185. Pump casing 11 is shown submerged in exterior liquid 23.

Threaded plug 173 is threaded into threads 171 at the outer end of bore 170 to seal the radial extremity of cross bore 170. Discharge pipe 162 is threaded into threads 167 at the upper end of block 160. The upper end of nipple 190 is threaded into threads 169 in the lower end of center bore 165. The lower end of nipple 190 is threaded into the upper end of coupling 195 that passes through casing penetration 198 and is secured and sealed to casing 11. Inlet check valve 210 is threaded into the lower end of coupling 195. Cage 215 with ball 220 inside is threaded into threads 187 in the upper end of large vertical bore 180. Ball 220 is of such a size as to easily travel in, out and within cage 215 to be able to rest on seat 185 and thus prevent interior liquid 24 from passing downward.

When casing 11 is exhausted of compressed air, interior liquid 24 that has exited inlet check valve 210 passes up into bore 165 of block 160, into internal liquid passage 175 and up through bore 183 and bore 180, lifting ball 220 from seat 185, carrying ball 220 up into cage 215 and up into protective cap 222 that has air opening 197 to allow air to escape and permit ball 220 to enter protective cap 222. When casing 11 is pressurized, interior liquid 24 flows through screen 218, down through cage 215, large vertical bore 180 and small vertical bore 183, through passage 175 and up discharge pipe 162 and out of casing 11. When the level of interior liquid 24 in casing 11 nears block 160, floating ball 220 follows the level of interior liquid 24 downward, leaving protective cap 215 to eventually rest on seat 185 to prevent interior liquid 24 and compressed air from being discharged through discharge pipe 162.

The advantages of this embodiment are that it allows discharge pipe 162 to be located in the center of casing 11. This arrangement allows easier assembly than offsetting discharge pipe 162 to allow room for the type of air-exclusion valve as shown in FIG. 2. With such a radial arrangement of multiple passages the cross-sectional area available for the flow of interior liquid 24 could be greater than could be achieved by previously discussed embodiments. This allows a higher pump rate to be achieved.

Other piping and machined part arrangements are capable of the same performance to one familiar with the piping and liquid flow.

Figure 9A:
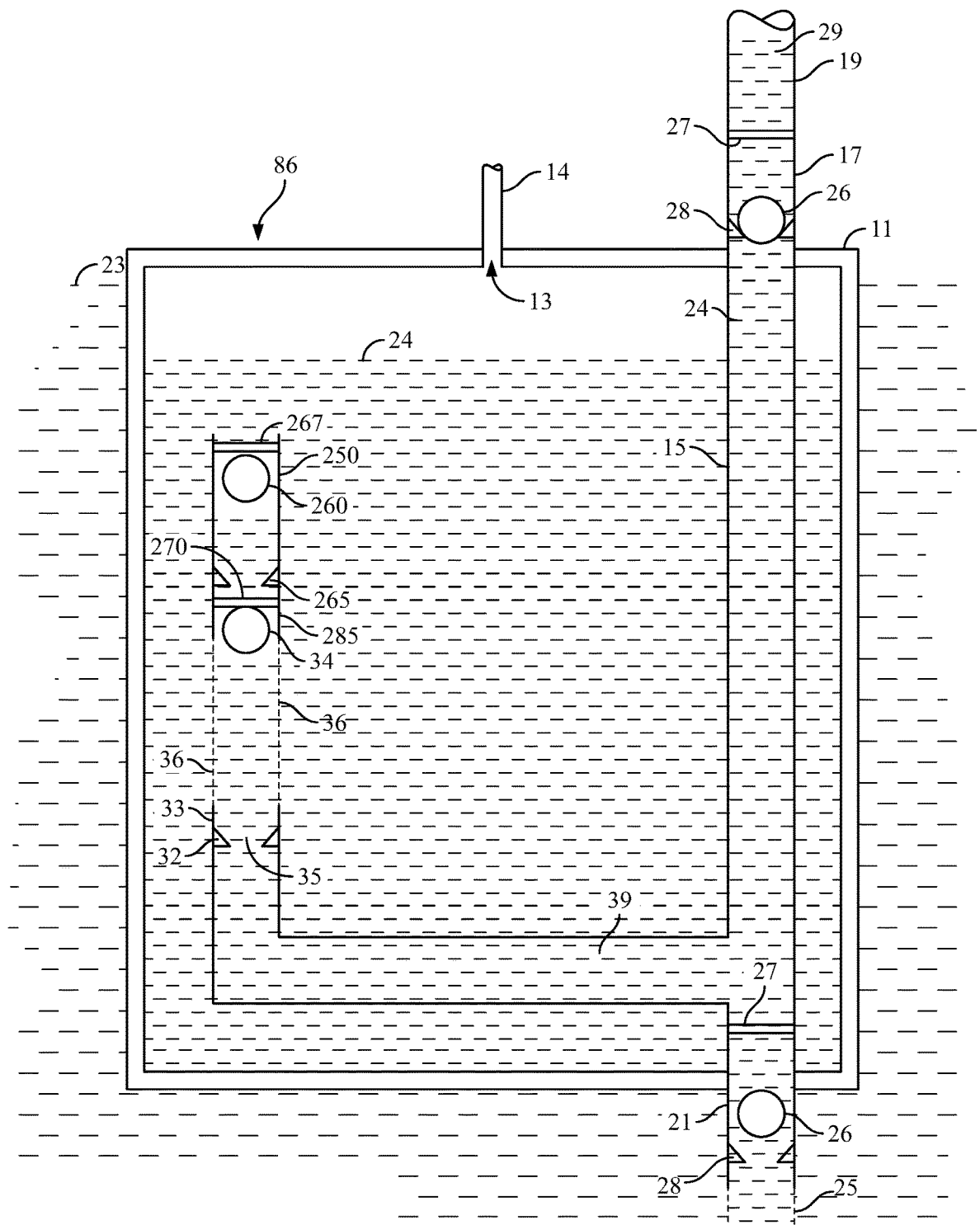
FIGS. 9A, 9B and 9C show schematics of a pneumatic canister pump with an air-exclusion valve with a quick-passage check valve mounted in fluid connection in different operation modes. The operation modes shown are during filling (FIG. 9A), during discharge (FIG. 9B) at the end of the discharge mode FIG. 9C).
Figure 9B:
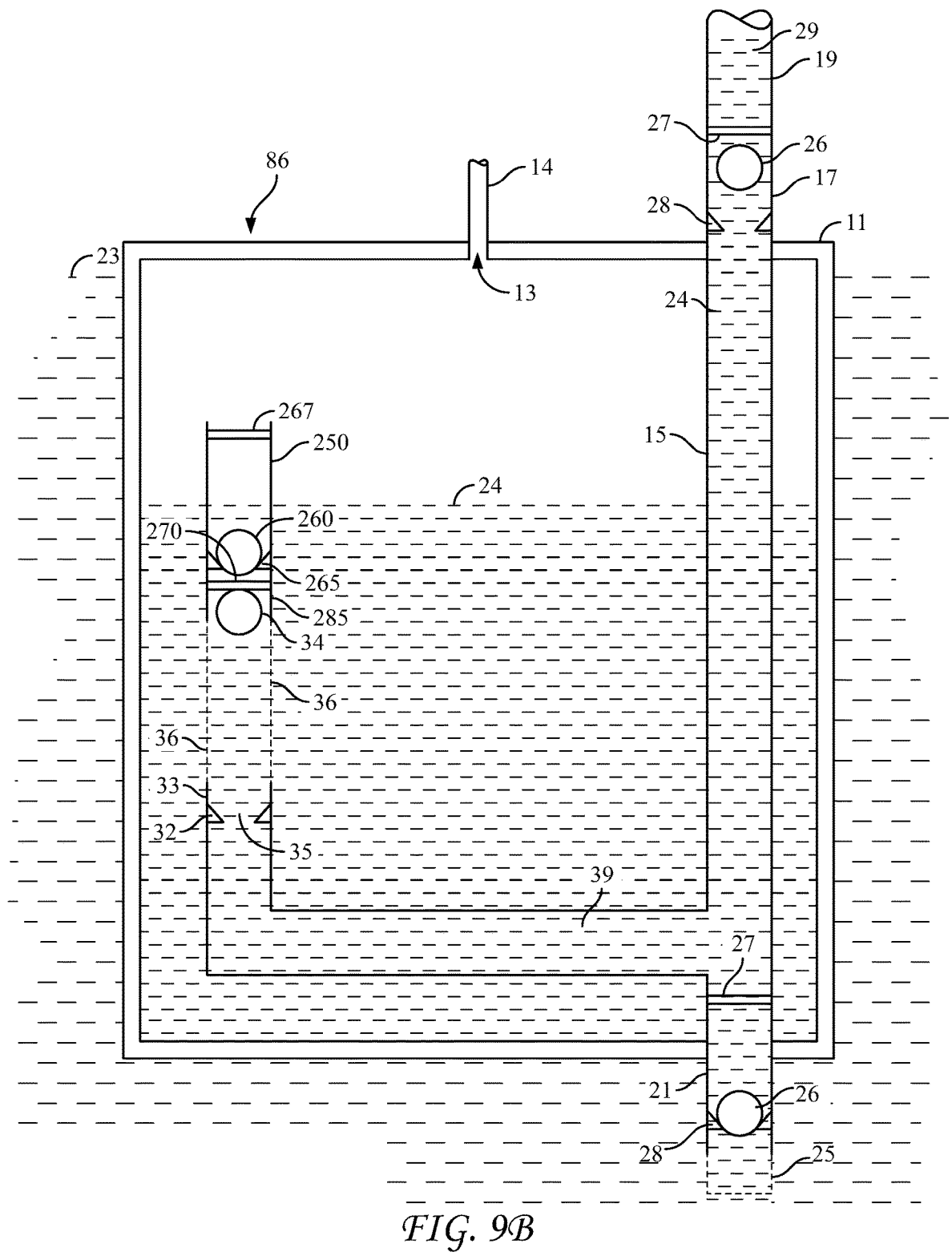
Figure 9C:
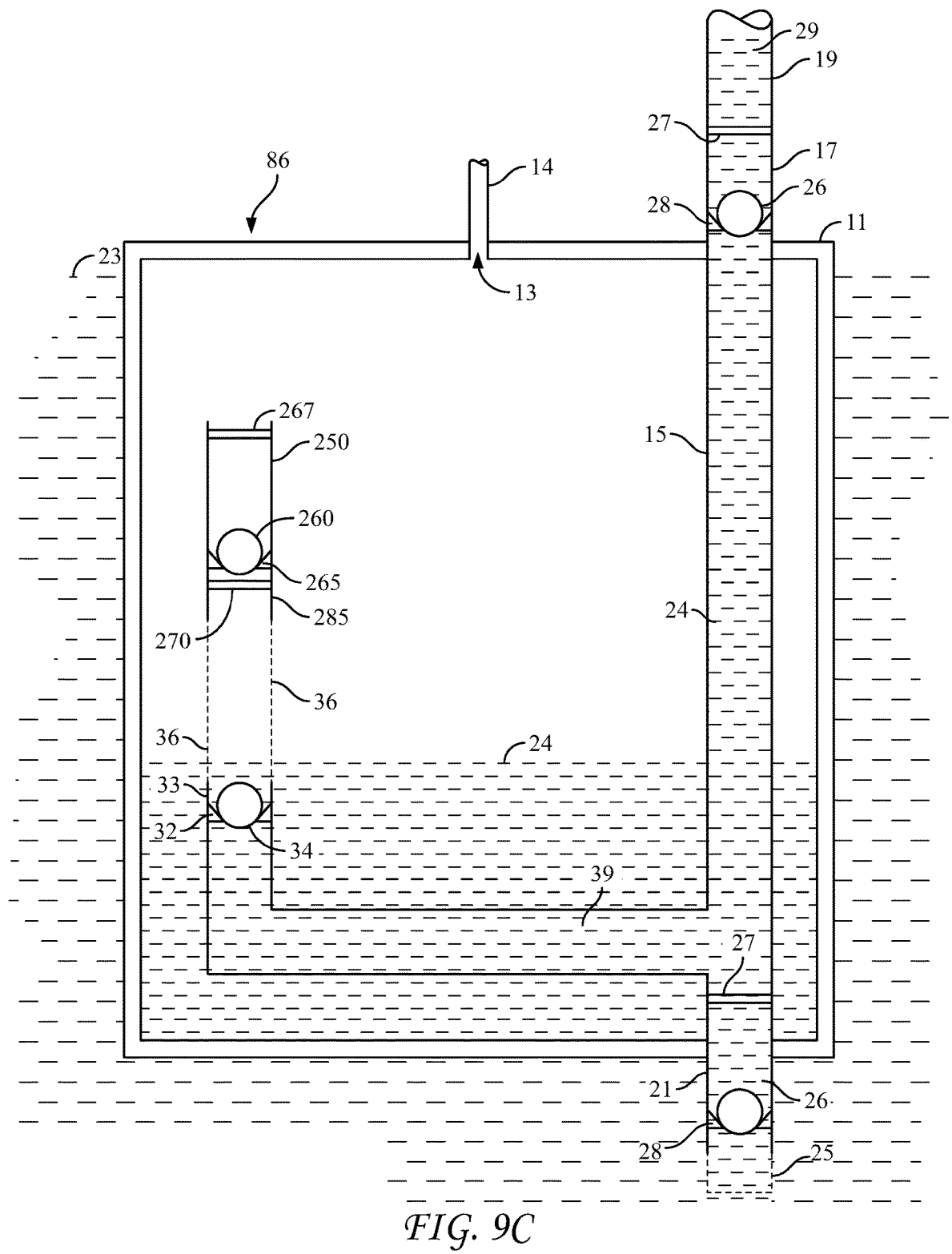

FIGS. 9A, 9B, and 9C—Pump With Air-Exclusion Valve And Quick-Passage Check Valve.

FIGS. 9A, 9B, and 9C show an embodiment which increases the time period between servicings of pump 86 to remove viscous and particulate deposits and build-up. Pump 86 is submerged in exterior liquid 23, and fitted with air-exclusion valve 33. This embodiment is similar to FIG.

2 with the exception that the top of protective cap 37 of FIG. 2 is replaced with crossbar 270 that provides a non-flow-restrictive (i.e., flow-allowing) ball retainer or retaining means to retain floating ball 34 and air opening 38 of FIG. 2 is replaced with quick-passage check valve 250. Due to the use of a crossbar (discussed below), the passageway of check valve 250 is more open or patent compared to opening 38 of FIG. 2. The vertical portion of protective cap 37 of FIG. 2 remains as a non-perforated area 285. Crossbar 270 is mounted at the top of non-perforated area 285 and check valve 250 is mounted in fluid connection with air-exclusion valve 33 above crossbar 270. Screened floating ball cage 36, non-perforated area 285, and cross bar 270 prevent floating ball 34 from traveling out of air-exclusion valve 33.

The original ceiling of protective cap 37 (FIG. 2) has an opening 38 through which air and liquid pass during both the fill and discharge cycles of the pump, The replaced ceiling of protective cap 37 has a passage for air and liquid that exists when needed (i.e., during the fill cycle of the pump) and does not exist when flow is not desired (i.e. during the discharge cycle of the pump). The replaced ceiling is closed and thus forms a flow barrier when it is needed to protect floating ball 34 during the discharge cycle of the pump. Cap 285 is open and provides relatively large openings when rapid liquid passage is required during the fill cycle of the pump. Check valve 250 is referred to as a "quick passage check valve" (1) to distinguish it from inlet check valve 21 and outlet check valve 17, and (2) because air opening 38, which it replaces, passes interior fluid 24 very slowly and would eventually clog in operation in most landfills due to deposits of and from the liquids usually pumped from landfill. In addition, as explained in more detail below, this combination is self-cleaning due to the rattling or vibration inherent in such ball check valves when passing liquid.

FIG. 9A shows pump 86 in the exhaust mode, filling with interior liquid 24. Compressed air is being exhausted out of opening 13 into air hose 14. Check ball 26 in outlet check valve 17 is held on seat 28 by fluid pressure in discharge hose 19, preventing discharged fluid 29 from entering pump 86 from liquid discharge hose 19. Check ball 26 in inlet check valve 21 is up, off seat 28 allowing pump 86 to fill. Liquid travels up through check valve 21, then through passage 39, up through air-exclusion valve 33 where floating ball 34 has risen off seat 32 and is resting against cross bar 270 within the non-perforated area 285. Liquid flows up through inlet check valve 21, through passage 39, Then a portion of the liquid flows through screened floating ball cage 36 and the remainder flows through check valve 250 where sinking ball 260 is up off seat 265 against crossbar 267, allowing interior liquid 24 to enter into the interior of pump casing 11. As shown, discharge check valve 17, inlet check valve 21, air-exclusion valve 33, and quick passage check valve 250 are arranged to allow liquid flow upward and prevent liquid flow downward. The passages around ball 34, crossbar 270, and in check valve 250 are patent compared to opening 38 (FIG. 2). Thus cross bar 270 provides a patent, non-flow-restrictive ball retainer for air exclusion valve 33 and both cross bar 270 and check valve 250 provide patent, non-flow-restrictive passageways when compared to protective cap 37 with opening 38 (FIG. 2).

Ball 260 is prevented from leaving check valve 250 by quick-passage check valve cross bar 267. The use of check valve 250 allows fluid to pass rapidly past floating ball 34, which is held against cross bar 270 and inhibits viscous portions of interior liquid 24, precipitated deposits, and particles from clinging to walls or becoming trapped in small passages as opening 38 (FIG. 2) in protective cap 37 would. The size of the openings in screened floating ball cage 36 can be chosen so the majority of interior liquid 24 will pass up through check valve 250. This structure allows floating ball 34 to rise quickly as interior liquid 24 rushes into pump during the exhaust (fill) cycle, be stopped by cross bar 270 and then rattle within air-exclusion valve 33, thus causing particles or any interior liquid 24 which is viscous and clinging to be shaken off, move quickly around, and flow away from floating ball 34 and the interior of air-exclusion valve 33. Such rattling is caused by the fluid dynamic drag of moving interior liquid 24 pulling floating ball 34 from one side to the other side of cross bar 270, causing floating ball 34 to bounce around the interior of air exclusion check valve 33. Such rattling can create vibrations throughout pump 86, thus helping to also keep clean other areas within pump 86. The same vibrations are created when sinking ball 260 is entrained and carried upward by rushing interior fluid 24 against cross bar 267 where sinking ball 260 rattles and moves from one side to the other side of cross bar 267 as interior liquid 24 passes through check valve 250.

Interior liquid 24 passes rapidly through check valve 250 into the interior of pump 86, thus helping prevent buildup of deposits and viscous portions of deposits and viscous portions of interior liquid 24. The internal surfaces of air-exclusion valve 33 and surface of floating ball 34 are maintained clean of deposits and viscous portions of interior liquid 24 due to the rapid flow of interior liquid 24 and the vibration of floating ball 34 and sinking ball 260 during the rapid flow of interior liquid 24. Thus check valve 250 comprises a fouling prevention and cleaning means.

FIG. 9B shows pump 86 in the pressurization mode, moving interior liquid 24 out from the interior of pump 86. Compressed air from air hose 14 enters through opening 13 into the upper interior of pump 86 at a greater pressure than the static pressure exerted by discharged liquid 29 in discharge hose 19, forcing interior liquid 24 up discharge pipe 15 and through outlet check valve 17. Check ball 26 in outlet check valve 17 is up, off of seat 28, allowing interior liquid 24 to exit pump 86. Check ball 26 in inlet check valve 21 is on seat 28, preventing interior liquid 24 from flowing out of the interior of pump casing 11 through inlet check valve 21. Sinking ball 260 is on seat 265, having sunk in interior liquid 24 between the end of the exhaust cycle and the beginning of the pressurization cycle of pump 86, thus preventing interior liquid 24 from passing into non-perforated area 285 where floating ball 34 is held via buoyancy against cross bar 270.

The seating of sinking ball 260 onto seat 265 allows floating ball 34 to remain in a quiescent area, up against cross bar 270, protected within non-perforated area 285 of air-exclusion valve 33 from drag forces of interior liquid 24 as it flows. Interior liquid 24 passes through screened area 36, through opening 35 in seat 32, through passage 39, up discharge pipe 15, and out of pump 86 through discharge check valve 17. Discharge hose 19 carries discharged liquid 29 away from pump 86.

Fouling prevention, cleaning, and protective means are also provided as will be appreciated. The means comprises check valve 250 through which interior liquid 24 passes rapidly into the interior of pump 86, thus helping to prevent buildup of deposits, viscous portions of such deposits, and viscous portions of interior liquid 24. The internal surfaces of air-exclusion valve 33 and the surface of floating ball 34 are maintained clean of deposits and viscous portions of interior liquid 24 through the rapid flow of interior liquid 24 and the vibration of floating ball 34 and sinking ball 260 during the rapid flow of interior liquid 24. Check valve 250 also comprises a cleaning means by which the internal surfaces of air-exclusion valve 33 and the surface of floating ball 34 are maintained clean of deposits and viscous portions of interior liquid 24 through the rapid flow of interior liquid 24 and the vibration of both floating ball 34 and sinking ball 260 during the rapid flow of interior liquid 24.

The protective means is comprised of check valve 250 which is closed during the discharge cycle of pump 86 and protects floating ball 34 from being dragged via fluid dynamic forces down onto seat 32, thus preventing interior liquid 24 from exiting pump 86 before the level of interior liquid 24 inside pump 86 comes in proximity to screened floating ball cage 36 in air-exclusion valve 33. This is accomplished by preventing any interior liquid 24 from passing through check valve 250 into air-exclusion valve 33 because sinking ball 260 is on seat 265 during the discharge cycle of pump 86.

FIG. 9C shows pump 86 toward the end of the pressurization cycle with interior liquid 24 prevented from exiting pump 86 and exterior liquid 23 from entering pump 86. Interior liquid 24 has been sufficiently driven from the interior of pump casing 11 to cause the level of interior liquid 24 to travel down near air-exclusion valve 33. When the level of interior liquid 24 reached screened floating ball cage 36, floating ball 34 traveled downward due to the falling fluid level. Ball 34 entered screened floating ball cage-36, where it was carried to seat 32, thus preventing interior liquid 24 and any compressed air from leaving pump 86.

Advantages

This embodiment allows rapid passage of interior liquid 24 around floating ball 34 during the fill cycle of pump 86 and prevents flow of interior liquid 24 around floating ball 34 during the discharge cycle of pump 86. The rapid influx keeps floating ball 34 and the interior of air-exclusion valve clean, while the protection of floating ball 34 from the flow of interior liquid 24 during the discharge cycle of pump 86 prevents floating ball 34 from being seated too soon, which would prevent pump 86 from emptying sufficiently.

The rapid influx of interior liquid 24 creates vibrations by the rapid movement of floating ball 34 and sinking ball 260 that help keep surfaces clean of debris and viscous portions of fluid 23.

Other piping and machined part arrangements are capable of the same performance to one familiar with piping and liquid flow.

CONCLUSIONS, RAMIFICATIONS AND SCOPE

Accordingly the reader will see that my pump embodiments have one or more advantages:
 The air-exclusion valve in combination with piping for allowing liquid flow to and from a discharge pipe in a pneumatic canister pump prevents compressed air and other gases that have entered the pump from being pushed up the discharge tube with the liquid in the pump, thus reducing turbulence in the liquid being discharged.
 Similarly oxygen contact with the liquid being pumped is reduced, lessening the likelihood of adverse chemical reactions.
 Also the chance that oxygen may mix with fumes from the liquids being pumped and other gases in the well is reduced, thus reducing the likelihood of a flammable or explosive mixture being created.
 Further, one embodiment of the controls need only one timer instead of the two that are normally used, thus reducing costs since pneumatic timers can be much more expensive than typical air valves.
 The controls need only one pneumatic timer instead of the two that are normally used, thus reducing possible problems because pneumatic timers are more prone to failure than most pneumatic air valves.
 Timers are not required to operate submitted embodiments of submersible, pneumatically-driven canister pumps with an air-exclusion valve.
 Compressed air pressure in the pump can be used to actuate the exhaust/fill cycle of the pump. As far as I know this ability is unique to the field.
 The setting of the controls by a technician is much simpler since there is no need to be careful setting a one- or two-timer control that governs the pressurization and exhaust cycles of the pump.
 Many sites use timer controls to operate submersible pneumatic canister pumps that can discharge compressed air with the fluid being pumped. With applicant's pump users can replace only the pump and maintain the controls to gain the advantage of not having compressed air discharged with the fluid being pumped. Thus it would be advantageous to the industry to have a submersible canister pump design that can work with timer controls that do not allow air discharge with fluid to occur.
 A quick-passage check valve mounted on the outlet of an air exclusion valve as presented is novel and helps to prevent the build up of deposits and viscous fluids upon its walls and the ball of the air exclusion valve, which could cause the floating ball to stick in the raised location and prevent it from seating when the fluid level reaches the air-exclusion valve.
 The internal-float-actuated pump as shown in. Breslin '405 is currently the predominant pneumatic pump used in landfill leachate removal wells. Many such pumps have significant down-time due to deposition build-up of viscous fluids and particles causing the float and moving parts within the pump to jam and stick. The present pump addresses and solves this problem.

Thus it is seen that the various embodiments provide a pump and control system with one or more of the following advantages: novelty, economical, highly reliable, increased safety, reduction of maintenance for controls and downstream discharge equipment. The various embodiments have the capacity to successfully pump liquid without air being introduced to the liquid discharge stream.

While the above description contains many specifics, these should not be construed as limiting the scope of the embodiments, but as merely providing illustrations of some of several embodiments. For example, a pneumatic valve may be actuated instead of an electrical switch when used in combination with the float at the top of the pump. Such pneumatic float switches are available from Kenco Engineering Co. of Tulsa, Okla.

Those skilled in the art will envision many other possible variations are within its scope. Accordingly the reader is requested to determine the scope by the appended claims and their legal equivalents, rather than by the examples given.

The invention claimed is:

1. A pneumatically driven canister liquid pump that prevents compressed air from accompanying a discharged liquid, comprising:

a. a sealed casing having upper and lower ends with an interior into which exterior liquid to be pumped can enter and from which interior liquid to be discharged can be pumped;
b. a discharge pipe in liquid connection with said sealed casing, said discharge pipe having an interior liquid passage and upper and lower ends for conveying said interior liquid from said interior of said sealed casing;
c. an inlet check valve for allowing said exterior liquid into said sealed casing and preventing said interior liquid from flowing out of said sealed casing;
d. a discharge check valve for allowing said interior liquid out of said sealed casing and preventing discharged liquid from flowing into said sealed casing;
e. a passage through a wall of said sealed casing for allowing compressed air (1) into said sealed casing to pressurize said interior of said sealed casing, and (2) out of said sealed casing to exhaust said of said sealed casing;
f. an air-exclusion valve in fluid connection with said discharge pipe for preventing said compressed air from flowing out of said sealed casing through said discharge pipe and into said discharged liquid;
g. piping between said air-exclusion valve and said discharge pipe through which said interior liquid can pass; and
h. a quick-passage check valve comprising a check ball that sinks in said interior fluid and a seat for said sinking ball, said quick-passage check valve mounted in fluid connection with said air-exclusion valve, said quick-passage check valve being arranged to (a) allow said interior liquid to flow through said quick-passage check valve after said interior liquid has exited said inlet check valve while said compressed air is being exhausted from said interior of said sealed casing, and (b) prevent said interior liquid from flowing back through said quick-passage check valve while said interior of said sealed casing is being pressurized with said compressed air and said interior liquid is pumped out of said sealed casing, thus creating a flow barrier at the upper end of said air-exclusion valve while said interior of said sealed casing is being pressurized and providing a patent liquid passageway while said compressed air is being exhausted from said interior of said sealed casing;

whereby when said sealed casing is submerged in said exterior liquid and said compressed air is alternately allowed out of said interior of said sealed casing to exhaust said sealed casing and into said sealed casing to pressurize said interior of said sealed casing (1) said exterior liquid passes into said sealed casing through said inlet check valve and said interior liquid is pumped out of said sealed casing via said discharge pipe and said discharge check valve, and (2) said compressed air is prevented from being transmitted out of said sealed casing through said discharge pipe and said discharge check valve into said discharged liquid.

2. The pump of claim 1, wherein said air-exclusion valve includes a ball and a seat located near said lower end of said discharge pipe.

3. The pump of claim 1, wherein said air-exclusion valve includes a ball and a seat, said seat being mounted so that said seat faces said upper end of said sealed casing.

4. The pump of claim 3, wherein said air-exclusion valve includes a fluid passage with a perforated lower end and a solid upper end extending above said seat so as to confine and protect said ball and allow said ball to move freely upward and downward within said fluid passage and be directed toward said seat as the level of said interior liquid approaches said air-exclusion valve.

5. The pump of claim 1, wherein said discharge pipe is offset from the centerline of said sealed casing in the area of said air-exclusion valve.

6. The pump of claim 1, wherein said air-exclusion valve is in fluid connection with said inlet check valve and said discharge pipe.

7. The pump of claim 1, wherein said quick-passage check valve with sinking ball is connected directly to the output of said air-exclusion valve and said interior liquid flows through said quick-passage check valve after exiting said air-exclusion valve.

8. The pump of claim 1, wherein said air-exclusion valve comprises a non-flow-restrictive or flow-allowing ball retainer.

9. A pneumatically driven canister liquid pump that prevents compressed air from accompanying a discharged liquid, comprising:
a. a sealed casing having upper and lower ends with an interior into which exterior liquid to be pumped can enter and from which interior liquid to be discharged can be pumped;
b. a discharge pipe in liquid connection with said sealed casing, said discharge pipe having an interior liquid passage and upper and lower ends for conveying said interior liquid from said interior of said sealed casing;
c. an inlet check valve for allowing said exterior liquid into said sealed casing and preventing said interior liquid from flowing out of said sealed casing;
d. a discharge check valve for allowing said interior liquid out of said sealed casing and preventing discharged liquid from flowing into said sealed casing;
e. a passage through a wall of said sealed casing for allowing compressed air (1) into said sealed casing to pressurize said interior of said sealed casing, and (2) out of said sealed casing to exhaust said interior of said sealed casing;
f. an air-exclusion valve having (1) a floating ball in fluid connection with said discharge pipe for preventing said compressed air from flowing out of said sealed casing through said discharge pipe and into said discharged liquid, and (2) non-flow-restrictive ball retainer for containing said floating ball within said air-exclusion valve;
g. piping between said air-exclusion valve and said discharge pipe through which said interior liquid can pass; and
h. a quick-passage check valve mounted in fluid connection with said air-exclusion valve above said non-flow-restrictive ball retainer for containing said floating ball within said air-exclusion valve, said quick-passage check valve being arranged to (a) allow said interior liquid to flow through said quick-passage check valve after said interior liquid has exited said inlet check valve while said compressed air is being exhausted from said interior of said sealed casing, and (b) prevent said interior liquid from flowing back through said quick-passage check valve while said interior of said sealed casing is being pressurized with said compressed air and said interior liquid is pumped out of said sealed casing; thus creating a flow barrier at the upper end of said air-exclusion valve while said interior of said sealed casing is being pressurized and providing a patent liquid passageway while said compressed air is being exhausted from said interior of said sealed casing;

whereby when said sealed casing is submerged in said exterior liquid and said compressed air is alternately allowed out of said interior of said sealed casing to exhaust said sealed casing and into said sealed casing to pressurize said interior of said sealed casing, (1) said exterior liquid passes into said sealed casing through said inlet check valve and said interior liquid is pumped out of said sealed casing via said discharge pipe and said discharge check valve, and (2) said compressed air is prevented from being transmitted out of said sealed casing through said discharge pipe and said discharge check valve into said discharged liquid.

10. The pump of claim 9, wherein said air-exclusion valve includes a ball and a seat located near said lower end of said discharge pipe.

11. The pump of claim 9, wherein said air-exclusion valve includes a ball and a seat, said seat being mounted so that said seat faces said upper end of said sealed casing.

12. The pump of claim 11, wherein said air-exclusion valve includes a fluid passage with a perforated lower end and a solid upper end extending above said seat so as to confine and protect said ball and allow said ball to move freely upward and downward within said fluid passage and be directed toward said seat as the level of said interior liquid approaches said air-exclusion valve.

13. The pump of claim 9, wherein said air-exclusion valve is located inside said sealed casing.

14. The pump of claim 9, wherein said discharge pipe is offset from the centerline of said sealed casing in the area of said air-exclusion valve.

15. The pump of claim 9, wherein said air-exclusion valve is in fluid connection with said inlet check valve and said discharge pipe.

16. The pump of claim 9, wherein said quick-passage check valve is connected directly to the output of said air-exclusion valve and said interior liquid flows through said quick-passage check valve after exiting said air-exclusion valve.

17. The pump of claim 9, wherein said quick-passage check valve contains a sinking check ball and a mating seat for preventing reverse flow.

18. A pneumatically driven canister liquid pump that prevents compressed air from accompanying a discharged liquid, comprising:
   a. a sealed casing having upper and lower ends with an interior into which exterior liquid to be pumped can enter and from which interior liquid to be discharged can be pumped;
   b. a discharge pipe in liquid connection with said sealed casing, said discharge pipe having an interior liquid passage and upper and lower ends for conveying said interior liquid from said interior of said sealed casing;
   c. an inlet check valve for allowing said exterior liquid into said sealed casing and preventing said interior liquid from flowing out of said sealed casing;
   d. a discharge check valve for allowing said interior liquid out of said sealed casing and preventing discharged liquid from flowing into said sealed casing;
   e. a passage through a wall of said sealed casing for allowing compressed air (1) into said sealed casing to pressurize said interior of said sealed casing, and (2) out of said sealed casing to exhaust said interior of said sealed casing;
   f. an air-exclusion valve having (1) a floating ball in fluid connection with said discharge pipe for preventing said compressed air from flowing out of said sealed casing through said discharge pipe and into said discharged liquid, and (2) a retainer for containing said floating ball within said air-exclusion valve;
   g. piping between said air-exclusion valve and said discharge pipe through which said interior liquid can pass; and
   h. a quick-passage check valve mounted in fluid connection with said air-exclusion valve said quick-passage check valve containing a sinking ball and being arranged to (a) allow said interior liquid to flow through said quick-passage check valve after said interior liquid has exited said inlet check valve while said compressed air is being exhausted from said interior of said sealed casing, and (b) prevent said interior liquid from flowing back through said quick-passage check valve while said interior of said sealed casing is being pressurized with said compressed air and said interior liquid is pumped out of said sealed casing; thus creating a flow barrier at the upper end of said air-exclusion valve while said interior of said sealed casing is being pressurized and providing a patent liquid passageway while said compressed air is being exhausted from said interior of said sealed casing;

whereby when said sealed casing is submerged in said exterior liquid and said compressed air is alternately allowed out of said interior of said sealed casing to exhaust said sealed casing and into said sealed casing to pressurize said interior of said sealed casing, (1) said exterior liquid passes into said sealed casing through said inlet check valve and said interior liquid is pumped out of said sealed casing via said discharge pipe and said discharge check valve, and (2) said compressed air is prevented from being transmitted out of said sealed casing through said discharge pipe and said discharge check valve into said discharged liquid.

19. The pump of claim 18, wherein said air-exclusion valve includes a ball and a seat located near said lower end of said discharge pipe.

20. The pump of claim 18, wherein said air-exclusion valve includes a ball and a seat, said seat being mounted so that said seat faces said upper end of said sealed casing.

21. The pump of claim 20, wherein said air-exclusion valve includes a fluid passage with a perforated lower end and a solid upper end extending above said seat so as to confine and protect said ball and allow said ball to move freely upward and downward within said fluid passage and be directed toward said seat as the level of said interior liquid approaches said air-exclusion valve.

22. The pump of claim 18, wherein said air-exclusion valve is located inside said sealed casing.

23. The pump of claim 18, wherein said discharge pipe is offset from the centerline of said sealed casing in the area of said air-exclusion valve.

24. The pump of claim 18, wherein said air-exclusion valve is in fluid connection with said inlet check valve and said discharge pipe.

25. The pump of claim 18, wherein said quick-passage check valve is connected directly to the output of said air-exclusion valve and said interior liquid flows through said quick-passage check valve after exiting said air-exclusion valve.

26. A pneumatically driven canister liquid pump that prevents compressed air from accompanying a discharged liquid, comprising:

a. a sealed casing having upper and lower ends with an interior into which exterior liquid to be pumped can enter and from which interior liquid to be discharged can be pumped;
b. a discharge pipe in liquid connection with said sealed casing, said discharge pipe having an interior liquid passage and upper and lower ends for conveying said interior liquid from said interior of said sealed casing;
c. an inlet check valve for allowing said exterior liquid into said sealed casing and preventing said interior liquid from flowing out of said sealed casing;
d. a discharge check valve for allowing said interior liquid out of said sealed casing and preventing discharged liquid from flowing into said sealed casing;
e. a passage through a wall of said sealed casing for allowing compressed air (1) into said sealed casing to pressurize said interior of said sealed casing, and (2) out of said sealed casing to exhaust said interior of said sealed casing;
f. an air-exclusion valve having (1) a floating ball in fluid connection with said discharge pipe for preventing said compressed air from flowing out of said sealed casing through said discharge pipe and into said discharged liquid, and (2) a retainer for containing said floating ball within said air-exclusion valve;
g. piping between said air-exclusion valve and said discharge pipe through which said interior liquid can pass; and
h. a quick-passage check valve mounted in fluid connection with said air-exclusion valve and being arranged to (a) allow said interior liquid to flow through said quick-passage check valve after said interior liquid has exited said inlet check valve while said compressed air is being exhausted from said interior of said sealed casing, and (b) prevent said interior liquid from flowing back through said quick-passage check valve while said interior of said sealed casing is being pressurized with said compressed air and said interior liquid is pumped out of said sealed casing; thus creating a flow barrier at the upper end of said air-exclusion valve while said interior of said sealed casing is being pressurized and providing a patent liquid passageway while said compressed air is being exhausted from said interior of said sealed casing,
i. said at least one inlet check valve, said at least one discharge check valve, said air-exclusion valve, and said quick-passage check valve all arranged to allow liquid flow in an upward direction and prevent liquid flow in a downward direction,
whereby when said sealed casing is submerged in said exterior liquid and said compressed air is alternately allowed out of said interior of said sealed casing to exhaust said sealed casing and into said sealed casing to pressurize said interior of said sealed casing, (1) said exterior liquid passes into said sealed casing through said inlet check valve and said interior liquid is pumped out of said sealed casing via said discharge pipe and said discharge check valve, and (2) said compressed air is prevented from being transmitted out of said sealed casing through said discharge pipe and said discharge check valve into said discharged liquid.

27. A pneumatically driven canister liquid pump that prevents compressed air from accompanying a discharged liquid, comprising:
a. a sealed casing having upper and lower ends with an interior into which exterior liquid to be pumped can enter and from which interior liquid to be discharged can be pumped;
b. a discharge pipe in liquid connection with said sealed casing, said discharge pipe having an interior liquid passage and upper and lower ends for conveying said interior liquid from said interior of said sealed casing;
c. an inlet check valve for allowing said exterior liquid into said sealed casing and preventing said interior liquid from flowing out of said sealed casing;
d. a discharge check valve for allowing said interior liquid out of said sealed casing and preventing discharged liquid from flowing into said sealed casing;
e. a passage through a wall of said sealed casing for allowing compressed air (1) into said sealed casing to pressurize said interior of said sealed casing, and (2) out of said sealed casing to exhaust said interior of said sealed casing;
f. an air-exclusion valve having (1) a floating ball in fluid connection with said discharge pipe for preventing said compressed air from flowing out of said sealed casing through said discharge pipe and into said discharged liquid, and (2) a retainer for containing said floating ball within said air-exclusion valve;
g. piping between said air-exclusion valve and said discharge pipe through which said interior liquid can pass; and
h. a quick-passage check valve mounted in fluid connection with said air-exclusion valve and being arranged to (a) allow said interior liquid to flow through said quick-passage check valve after said interior liquid has exited said inlet check valve while said compressed air is being exhausted from said sealed casing, and (b) prevent said interior liquid from flowing back through said quick-passage check valve while said interior of said sealed casing is being pressurized with said compressed air and said interior liquid is pumped out of said sealed casing; thus creating a flow barrier at the upper end of said air-exclusion valve while said interior of said sealed casing is being pressurized and providing a patent liquid passageway while said compressed air is being exhausted from said interior of said sealed casing,
i. said quick-passage check valve and said air-exclusion valve arranged to pass said interior liquid when said compressed air is being exhausted from the pump;
whereby when said sealed casing is submerged in said exterior liquid and said compressed air is alternately allowed out of said interior of said sealed casing to exhaust said sealed casing and into said sealed casing to pressurize said interior of said sealed casing, (1) said exterior liquid passes into said sealed casing through said inlet check valve and said interior liquid is pumped out of said sealed casing via said discharge pipe and said discharge check valve, and (2) said compressed air is prevented from being transmitted out of said sealed casing through said discharge pipe and said discharge check valve into said discharged liquid.

* * * * *